(12) United States Patent
Bemowski et al.

(10) Patent No.: US 11,500,247 B2
(45) Date of Patent: Nov. 15, 2022

(54) LIQUID CRYSTAL SENSOR

(71) Applicant: PLATYPUS TECHNOLOGIES, LLC, Madison, WI (US)

(72) Inventors: Ross D. Bemowski, Madison, WI (US); Bart A. Grinwald, Madison, WI (US)

(73) Assignee: PLATYPUS TECHNOLOGIES, LLC, Madison, WI (US)

( * ) Notice: Subject to any disclaimer, the term of this patent is extended or adjusted under 35 U.S.C. 154(b) by 1187 days.

(21) Appl. No.: 15/777,389

(22) PCT Filed: Nov. 17, 2016

(86) PCT No.: PCT/US2016/062508
§ 371 (c)(1),
(2) Date: May 18, 2018

(87) PCT Pub. No.: WO2017/087659
PCT Pub. Date: May 26, 2017

(65) Prior Publication Data
US 2020/0409221 A1    Dec. 31, 2020

Related U.S. Application Data

(60) Provisional application No. 62/256,976, filed on Nov. 18, 2015.

(51) Int. Cl.
*G01N 21/77* (2006.01)
*G02F 1/1337* (2006.01)
(Continued)

(52) U.S. Cl.
CPC ........ *G02F 1/133711* (2013.01); *C09K 19/56* (2013.01); *G01N 21/17* (2013.01);
(Continued)

(58) Field of Classification Search
CPC ........ G01N 21/17; G01N 21/77; G01N 21/78; G01N 2021/8477; C09K 19/56; C09K 2219/17; G02F 1/1392
(Continued)

(56) References Cited

U.S. PATENT DOCUMENTS 6,171,802 B1    1/2001    Woolverton et al.
6,284,197 B1    9/2001    Abbott et al.
(Continued)

FOREIGN PATENT DOCUMENTS

WO    1999/063329    12/1999
WO    2001/061325    8/2001
(Continued)

OTHER PUBLICATIONS

Crystal Diagnosics. [Online] www.crystaldiagnostics.com/technology/works/.
(Continued)

*Primary Examiner* — Ruiyun Zhang
(74) *Attorney, Agent, or Firm* — Casimir Jones S.C.; J. Mitchell Jones

(57) ABSTRACT

Provided herein is technology relating to sensors for detecting an analyte and particularly, but not exclusively, to liquid crystal sensors, methods of producing liquid crystal sensors, and methods of using liquid crystal sensors.

10 Claims, 8 Drawing Sheets

(51) Int. Cl.
*C09K 19/56* (2006.01)
*G01N 21/78* (2006.01)
*G02F 1/139* (2006.01)
*G01N 21/17* (2006.01)
*G01N 21/84* (2006.01)

(52) U.S. Cl.
CPC .............. *G01N 21/77* (2013.01); *G01N 21/78* (2013.01); *G02F 1/1392* (2013.01); *C09K 2219/17* (2013.01); *G01N 2021/7786* (2013.01); *G01N 2021/8477* (2013.01)

(58) Field of Classification Search
USPC .................. 349/58, 199; 422/400; 435/287.1
See application file for complete search history.

(56) References Cited

U.S. PATENT DOCUMENTS

| | | | |
|---|---|---|---|
| 6,673,398 B2 | 1/2004 | Schneider et al. | |
| 2005/0153357 A1 | 7/2005 | Eichler et al. | |
| 2007/0048178 A1* | 3/2007 | Gu ........................ | B82Y 30/00 |
| | | | 422/504 |
| 2009/0198117 A1 | 8/2009 | Cooper et al. | |
| 2011/0007261 A1 | 1/2011 | Abbott et al. | |
| 2011/0141431 A1 | 6/2011 | Jordan | |
| 2015/0308995 A1 | 10/2015 | Chen et al. | |

FOREIGN PATENT DOCUMENTS

| | | |
|---|---|---|
| WO | 2001/061357 | 8/2001 |
| WO | 2010/031047 | 3/2010 |
| WO | 2014/165196 | 10/2014 |
| WO | 2014/165800 | 10/2014 |

OTHER PUBLICATIONS

Gupta et al. (1999) "Using Droplets of Nematic Liquid Crystal To Probe the Microscopic and Mesoscopic Structure of Organic Surfaces" Langmuir 15: 7213-7223.

Gupta et al. Optical amplification of ligand-receptor binding using liquid crystals. (1998) Science 279: 2077-2080.

Hunter, et al. Adsorbate-Induced Anchoring Transitions of Liquid Crystals on Surfaces Presenting Metal Salts with Mixed Anions. ACS Appl. Mater. Interfaces, 2014, 6 (4), pp. 2362-2369.

International Search Report and Written Opinion, International Patent Application No. PCT/US2016/062508, dated Mar. 24, 2017.

Kim et al. (2000) "Orientations of Liquid Crystals on Mechanically Rubbed Films of Bovine Serum Albumin: A Possible Substrate for Biomolecular Assays Based on Liquid Crystals" Analytical Chemistry 72: 4646-4653.

Noonan, P.S. et al. Mixed Alkylsilane Functionalized Surfaces for Simultaneous Wetting and Homeotropic Anchoring of Liquid Crystals. 11, 2011, ACS Applied Materials & Interfaces, vol. 3, pp. 4374-4380.

Shah et al. (2001) "Principals for Measurement of Chemical Exposure Based on Recognition-Driven Anchoring Transitions in Liquid Crystals" Science 293: 1296-99.

Shiyanovskii, S.V. et al. Lyotropic Chromonic Liquid Crystals for Biological Sensing Applications 2005, Molecular Crystals and Liquid Crystals. 2005, vol. 434, pp. 259-270.

Skaife et al. (2000) "Quantitative Interpretation of the Optical Textures of Liquid Crystals Caused by Specific Binding of Immunoglobulins to Surface-Bound Antigens" Langmuir 16: 3529-3536.

* cited by examiner

LIQUID CRYSTAL SENSOR

CROSS-REFERENCE TO RELATED APPLICATIONS

This application is a 371 U.S. National Phase Entry of International Application No. PCT/US2016/062508, filed Nov. 17, 2016, which claims priority to U.S. Provisional Pat. Appl. No. 62/256,976, filed Nov. 18, 2015, the contents of which are incorporated herein by reference in their entireties.

STATEMENT REGARDING FEDERALLY SPONSORED RESEARCH OR DEVELOPMENT

This invention was made with government support under Grant Nos. W911NF-13-P-0030 and W911NF-14-C-0165 awarded by the US Army Research Office and Grant No. 1R21OH010116-01A1 awarded by the National Institute of Environmental Health Sciences (NIEHS). The government has certain rights in the invention.

FIELD

Provided herein is technology relating to sensors for detecting an analyte and particularly, but not exclusively, to liquid crystal sensors, methods of producing liquid crystal sensors, and methods of using liquid crystal sensors.

BACKGROUND

The air contains numerous toxins, depending on location, season and atmospheric conditions. Many devices are available to measure toxic gases, but for measurements of sub-ppm (parts per million) levels, devices are usually expensive, elaborate, and financially and technically beyond the reach of the average citizen. Thus, there are no reliable technologies for assessing the broad health impacts of chronic exposure to low levels of many air pollutants. Consequently, the National Institute of Environmental Health Sciences and Environmental Protection Agency have formed plans to improve monitoring individual exposures and responses to environmental toxins and increase emphasis on community monitoring to understand individuals' local exposures to toxins. However, equipping large numbers of individuals and/or geographic sites with available monitors capable of accurately measuring low levels of toxins would be prohibitively expensive. Therefore, affordable devices capable of measuring personal exposures to toxic gases are urgently needed. The EPA has also found that available "simple" toxic gas monitors have presented difficulties of operation and interpretation when deployed by non-technical people under EPA community monitoring initiatives. Accordingly, personal exposure monitors must also be easy to use and interpret if personal monitoring is to be widely adopted. These efforts would be greatly aided by sensor technologies that are affordable (e.g., less than $100 per unit), sufficiently sensitive and robust to detect low levels of toxins in the environment, and easy to use without technical training so that individuals with little or no technical training can use them correctly.

SUMMARY

Liquid crystal-based sensors and analytical platforms are useful for the ready detection and measurement of chemical and biological substances. A liquid crystal-based sensor is made by spreading a thin film of a liquid crystal over a chemically functionalized surface that aligns the liquid crystal molecules in one orientation. After interaction with the analyte, the liquid crystal alignment changes, which is usually detected as a change in an optical property of the sensor, e.g., brightness when viewed through crossed polarizers.

These liquid crystal technologies have been used to sense analytes such as toxic gases. Commercial devices for retail sale have been produced that do not require electrical power to operate. Moreover, the devices are easy to use (they typically weighs only ~10 g and simply clip to clothing) and easy to interpret (e.g., by simply observing the length of a bright front on a calibrated scale).

Existing liquid crystal-based sensors comprise a chemical functionality that both aligns the liquid crystal and interacts with the analyte. However, sensor design has been inhibited by the restrictions imposed by using the same chemical functionality to provide both alignment and analyte interaction. For instance, some chemical functionalities that align liquid crystals do not interact appropriately with analytes of interest to provide sensing and some chemical functionalities that provide sensing capabilities for analytes of interest do not align liquid crystals. Further, the limited range of chemical functionalities that adequately provide both alignment and interaction are often problematic for other reasons, e.g., low sensitivity and/or low specificity, significant cross-reactivity with other analytes, sensitivity to temperature and humidity changes, prohibitive expense in capital or time to produce, and/or problematic chemistries. Moreover, attempts to chemically modify the chemical functionality to provide an appropriate alignment or analyte interaction functionality often results in abrogating and/or significantly hindering the other functionality. Accordingly, liquid-crystal based sensors would benefit from new approaches for liquid crystal alignment and/or analyte interaction.

Accordingly, provided herein is a liquid crystal (LC) sensor technology based on separating LC alignment from analyte detection. For instance, in some embodiments, a sensor comprises a functionality that aligns LCs (e.g., an alignment functionality that interacts with the LC) and a separate functionality that detects the analyte (e.g., a detection functionality that interacts with the analyte). Upon interacting with the analyte, the detection functionality communicates the detection of the analyte to the alignment functionality (e.g., via the making or breaking of bonds, physical changes, transmission of energy, transfer of a photon (hv), etc.), which further causes a change in the alignment of the LC. The change in the LC produces a detectable signal associated with analyte detection.

Separating the alignment functionality from the detection functionality provides for the use of detection chemistries that do not necessarily align liquid crystals. Accordingly, sensor design benefits from the availability of a much broader range of chemicals for use in both the alignment of the LC and the detection of analytes. Thus, the technology provides for detecting more analytes than extant technologies and further allows more selective chemistries to be chosen for a target analyte. The technology thus provides for an "analyte first" design, which is based on selecting a detection chemistry that is appropriate of an analyte of interest, rather than searching first for compounds that align a liquid crystal and subsequently investigating if the candidate compound provides for adequate analyte detection.

In some embodiments, the alignment functionality is cleaved or displaced when the analyte interacts with the detection functionality. In some embodiments, the alignment functionality changes conformation, e.g., folds to a new orientation, when the analyte interacts with the detection functionality. For example, in some embodiments a change in conformation blocks the LC's access to the alignment functionality. In some embodiments, the analyte has a reversible interaction with the detection functionality; in some embodiments, the analyte has an irreversible interaction and/or reaction with the detection functionality. In some embodiments, the chemical structure of the alignment functionality and/or the detection functionality is bound to a surface with an anchor functionality (e.g., a thiol attached to a gold substrate, a silane attached to a glass substrate, a phosphonic acid attached to a metal oxide substrate or surface (e.g., a titanium oxide, a tantalum oxide, an aluminum oxide, a zirconium oxide, etc.). In some embodiments, choice of anchoring and/or alignment functionalities provides for the tuning of sensors for sensitivity and specificity.

Accordingly, provided herein are embodiments of a liquid crystal sensor for detecting an analyte, the liquid crystal sensor comprising a liquid crystal; an alignment functionality that interacts with the liquid crystal; and a detection functionality that interacts specifically with an analyte and communicates an analyte interaction to the alignment functionality. In some embodiments, the liquid crystal sensor comprises an alignment functionality that can exist in a first alignment functionality state and a second alignment functionality state. For example, in some embodiments, the interaction of the alignment functionality in the first alignment functionality state with the liquid crystal produces a first liquid crystal state (e.g., a first liquid crystal alignment or arrangement, a first liquid crystal orientation, a first liquid crystal phase, etc.) and interaction of the alignment functionality in the second alignment functionality state with the liquid crystal produces a second liquid crystal state (e.g., a second liquid crystal alignment or arrangement, a second liquid crystal orientation, a second liquid crystal phase, etc.)

In some embodiments, the liquid crystal state is a phase. For instance, in some embodiments, the first liquid crystal phase is selected from the group consisting of an isotropic phase, a nematic phase, or a smectic phase and the second liquid crystal phase is selected from the group consisting of an isotropic phase, a nematic phase, or a smectic phase.

In some embodiments, the liquid crystal state is an alignment or arrangement of the liquid crystal. For instance, in some embodiments, the first liquid crystal state comprises a homeotropic arrangement of the liquid crystal and the second liquid crystal state comprises a planar arrangement of the liquid crystal; or, the first liquid crystal state comprises a random planar arrangement of the liquid crystal and the second liquid crystal state comprise a uniform planar arrangement of the liquid crystal.

In some embodiments, the liquid crystal state is an orientation of the liquid crystal. For instance, in some embodiments, the first liquid crystal orientation is an aligned phase and the second liquid crystal orientation is a non-aligned phase; in some embodiments, the first liquid crystal orientation comprises liquid crystal aligned in a first direction and the second liquid crystal orientation comprises liquid crystal aligned in a second direction.

The technology provides a sensor in which detection of an analyte (e.g., by the detection functionality) effects a change in a liquid crystal manifest in some detectable property of the liquid crystal indicating that the analyte is present. Accordingly, in some embodiments of the technology the liquid crystal has a detectable property that is different in the first liquid crystal state relative to the second liquid crystal state, e.g., in some embodiments the detectable property is optical anisotropy, magnetic anisotropy, dielectric anisotropy, or phase transition temperature.

The technology is not limited in the mode of interaction between the alignment functionality and the liquid crystal. Indeed, embodiments of the technology comprise modes of interaction between the alignment functionality and the liquid crystal that include one or more of Van der Waals forces, hydrophobic interactions, ionic interactions, hydrogen bonding, dipole-dipole interaction, chemical bonding, coordination, electrostatic interactions, magnetic interactions, aromatic ring stacking, antibody-antigen interaction, aptamer-target interaction, avidin-biotin interaction, receptor-ligand interaction; monomer-monomer polymerization; enzyme-substrate interaction, metal-chelator interaction, and nucleic acid hybridization. Furthermore, the technology is not limited in the mode of interaction between the detection functionality and the analyte. For example, embodiments of the technology comprise modes of interaction between the detection functionality and the analyte that include one or more of coordination, metal-ligand interaction, Van der Waals forces, hydrophobic interactions, ionic interactions, hydrogen bonding, dipole-dipole interaction, chemical bonding, electrostatic interactions, magnetic interactions, aromatic ring stacking, antibody-antigen interaction, aptamer-target interaction, avidin-biotin interaction, receptor-ligand interaction; monomer-monomer polymerization; enzyme-substrate interaction, metal-chelator interaction, and nucleic acid hybridization.

In some embodiments, the analyte and a functional group of the detection functionality are reactants in an acid-base chemical reaction, an oxidation-reduction chemical reaction, a substitution chemical reaction, or combinations thereof.

In some embodiments, the detection functionality communicates the analyte interaction to the alignment functionality by a mode selected from the group consisting of chemical, physical, photonic, magnetic, electric, and/or by a combination of modes.

Further embodiments of the sensor technology comprise a substrate. While the technology is not limited in the substrate that finds use in embodiments of the sensor, exemplary substrates include a gold substrate, a glass substrate, a silicon substrate, or a metal oxide substrate (e.g., titanium oxide, aluminum oxide, tantalum oxide, zirconium oxide, etc.) though the technology contemplates any suitable substrate and is thus not limited to substrates of gold, glass, silicon, or metal oxide. Yet additional embodiments comprise an inorganic crystal substrate, an inorganic glass substrate, an inorganic oxide substrate, a metal substrate, or an organic polymer substrate.

In some embodiments, the technology comprises an anchor functionality, e.g., to attach the alignment functionality to a substrate and/or to attach the detection functionality to a substrate. The technology is not limited in the anchor functionality. For example, some exemplary anchor substrates comprise an anchor functionality comprising a thiol, a silane or an acid such as, e.g., a sulfonic, phosphonic, phosphoric, or carboxylic acid.

Further, the liquid crystal is not limited in the liquid crystal that finds use in the sensor. For example, in some embodiments, the liquid crystal is a fluorinated liquid crystal. In some embodiments, the liquid crystal does not comprise a cyano group. In some embodiments, the liquid crystal comprises a cyano group. Exemplary liquid crystals that find use in various embodiments include but are not limited to E7, 5CB, MLC-2080, MLC-15700, ZLI-4792, MLC-3016, and 6CB.

The liquid crystal technology finds use in detecting an analyte, e.g., according to embodiments of methods described herein. For example, some embodiments provide a method for detecting an analyte, the method comprising providing a liquid crystal sensor comprising a liquid crystal, an alignment functionality that interacts with the liquid crystal, and a detection functionality that interacts specifically with an analyte and communicates an analyte interaction to the alignment functionality; exposing the liquid crystal sensor to a sample suspected of comprising an analyte; and measuring a detectable property of the liquid crystal, wherein a change in the detectable property of the liquid crystal is indicative of the presence of the analyte. The technology is not limited in the measurement of the change of the detectable property, e.g., in some embodiments the change in the detectable property of the liquid crystal is determined by comparing the measured detectable property to a known value of the detectable property in the absence of the analyte or by comparing the measured detectable property to a previously measured value of the detectable property. Further, the technology is not limited in the type of the detectable property that is measured and that indicates a change in the liquid crystal state. Exemplary properties of liquid crystals that find use in various embodiments of the technology include optical anisotropy, magnetic anisotropy, dielectric anisotropy, and phase transition temperature. Further, the technology is not limited in the method used to measure the detectable property or a change in one or more detectable property/ies. For instance, some embodiments comprise measuring a reflection or a transmission of polarized light. Some embodiments compromise measuring capacitance. Some embodiments comprise measuring optical response while the liquid crystal is biased by an electric field or by a magnetic field.

In some embodiments, the detectable property of the liquid crystal in real time, e.g., to monitor the presence, amount, concentration, etc. of an analyte as a function of time.

Embodiments relate to methods of constructing a liquid crystal sensor. For example, some embodiments comprise attaching an anchor functionality to a substrate; providing a detection functionality that interacts with the anchoring functionality; providing an alignment functionality that communicates with the detection functionality; and providing a liquid crystal with which the alignment functionality interacts.

Embodiments of methods for construction of the sensors are not limited in the functionalities used for the anchor functionality, the detection functionality, the alignment functionality, and/or the liquid crystal. For example, in some embodiments, the anchor functionality comprises a carboxylate and a thiol or a silane or sulfonic, phosphonic, phosphoric, or carboxylic acid; in some embodiments, the detection functionality comprises a metal; in some embodiments, the alignment functionality comprises a carboxylate and an aliphatic tail or an aliphatic tail and one or more aromatic rings; in some embodiments, the liquid crystal is of E7, 5CB, MLC-2080, MLC-15700, ZLI-4792, MLC-3016, or 6CB. In some embodiments, the liquid crystal comprises a fluorinated liquid crystal; in some embodiments, the liquid crystal does not comprise a cyano group. In some embodiments, the liquid crystal comprises a cyano group.

Some embodiments further provide a liquid crystal sensor having an increased sensitivity for an analyte. For example, in some embodiments, the technology provides a liquid crystal sensor comprising a plurality of detection functionalities anchored to a substrate at a density that is less than a maximum density obtainable for the detection functionality attached to the substrate, e.g., at a fraction of the substrate surface density that ranges from approximately 0 to 1 (e.g., 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, and 0.99). The minimum amount of detection and or alignment functionalities to induce the initial orientation of the liquid crystal generally provides maximum sensitivity.

Some embodiments provide a liquid crystal sensor having an increased sensitivity for an analyte, the liquid crystal sensor comprising a substrate comprising a plurality of detection functionalities anchored to the substrate by an anchoring functionality attached to the substrate; and a plurality of spacer functionalities attached to the substrate, wherein said spacer functionalities do not provide the same influence to the liquid crystal as the detection and/or alignment functionality. In some embodiments, the fraction of anchoring functionalities relative to the sum of the anchoring and spacer functionalities ranges from approximately 0 to 1 (e.g., 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, and 0.99). The technology provides embodiments wherein, for example, a first chemical functionality comprises the detection functionality and the anchoring functionality and a second chemical functionality comprises the spacer functionality. The technology is not limited in the anchoring and spacer functionalities, e.g., particular embodiments provide that the first chemical functionality is aminothiophenol and the second chemical functionality is 11-mercaptoundecanoic acid. Some embodiments provide that the anchoring functionality and/or spacer functionality comprises a thiol or a silane or sulfonic, phosphonic, phosphoric, or carboxylic acid.

In addition, various embodiments provide a sensor with a less than maximum occupancy of one or more of the anchoring, detection, and/or alignment functionalities to provide a sensor with increased sensitivity. For example, embodiments provide a liquid crystal sensor having an increased sensitivity for an analyte, the liquid crystal sensor comprising a substrate, wherein a fraction of the substrate area that is less than 1 (e.g., 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, or 0.99) comprises one or more of an anchoring functionality; a detection functionality that interacts with an analyte; a detection functionality that communicates with an alignment functionality; an alignment functionality that communicates with a detection functionality; or an alignment functionality that interacts with a liquid crystal.

In some embodiments, sensitivity is increased by using a mixture of liquid crystals. For instance, in some embodiments a first liquid crystal of the mixture is aligned by the alignment functionality and a second liquid crystal of the mixture is not aligned by the alignment functionality. In such embodiments, while one liquid crystal of the mixture interacts with and is aligned by the alignment functionality and the other liquid crystal of the mixture does not interact with the alignment functionality, the two liquid crystals act together as a liquid crystal, e.g., to produce a detectable change in the presence of an analyte.

In some embodiments, the technology provides a liquid crystal sensor having an increased sensitivity for an analyte, the liquid crystal sensor comprising a plurality of detection functionalities that are pre-reacted with the analyte prior to testing a sample suspected of comprising the analyte. For example, embodiments provide a liquid crystal sensor wherein the fraction of the plurality of detection functionalities that are pre-reacted with the analyte is approximately 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, or 0.99 of the plurality of detection functionalities.

Some embodiments provide a liquid crystal sensor comprising a heterogenous sensitivity across the sensor surface, e.g., as provided by the sensitivity tuning technology described herein. In some embodiments, the sensor comprises multiple regions or zones of sensitivity (e.g., 2, 3, 4, 5, 6, 7, 8, 9, 10 or more regions or zones of sensitivity). In some embodiments, the sensitivity in each zone is homogenous and in some embodiments the sensitivity in each zone is heterogenous. For example, in some embodiments the sensitivity in each zone varies as a function of distance from the edge of each zone and, in some embodiments, the sensitivity varies as a function of distance from the site of analyte exposure of the device. The technology is not limited in the type of function that describes the sensitivity as it depends upon the distance from the edge of each zone and/or from the site of analyte exposure of the device—for example, in some embodiments the function is a linear function, a step function, a sawtooth function, a sigmoid function, an exponential function, or any other function. However, embodiments provide sensors that are not defined by any particular function describing the sensitivity to analyte across the surface of the sensor. Embodiments provide that the sensitivity tuning technology finds use in designing regions or zones of any homogenous or heterogenous sensitivity based on the needs of the user to detect analytes.

In some embodiments, the present invention provides methods for detection of analyte comprising: providing a substrate surface comprising at least one zone comprising a detection functionality specific for an analyte and a liquid crystal; and facilitating reaction of the analyte with the detection functionality under conditions such that the analyte reacts with the detection functionality to provide an alignment functionality to align the liquid crystal. In some embodiments, the reaction of the analyte with the detection functionality creates a covalent bond between the analyte and the detection functionality to provide the alignment functionality. In some embodiments, the reaction of the analyte with the detection functionality creates a polymer from the analyte to provide the alignment functionality. In some embodiments, the at least one zone further comprises one or more chemical functionalities that are nonreactive with the analyte. In some embodiments, the substrate comprises at least two zones, wherein each of the zones comprises a different ratio of detection functionalities and chemical functionalities that are nonreactive with the analyte. In some embodiments, the detection functionality comprises an alcohol group reactable with formaldehyde or acrolein. In some embodiments, the detection functionality comprises a metal alkylidene reactable with cycloalkenes or dienes. In some embodiments, the detection functionality comprises a metal alkylidyne reactable with cycloalkynes or diynes. In some embodiments, the detection functionality comprises a metalocene or copper radical transfer catalyst reactable with alkenes. In some embodiments, the alignment functionality provides a homeotropic orientation of the liquid crystal in the presence of an analyte.

In some embodiments, the present invention provides a liquid crystal sensor for detection of an analyte comprising: a substrate surface comprising at least two zones, each of the zones having associated therewith detection functionalities for the analyte and one or more chemical functionalities that are nonreactive with the analyte, wherein the ratio detection functionalities:one or more chemical functionalities that are nonreactive with the analyte at each of the at least two zones are different and wherein the detection functionality is converted into an alignment functionality in the presence of the analyte; and a liquid crystal in contact with the substrate and the detection functionalities. In some embodiments, the detection functionality is converted into an alignment functionality by polymerization of the analyte on the detection functionality. In some embodiments, the detection functionality comprises an alcohol group reactable with formaldehyde or acrolein. In some embodiments, the detection functionality comprises a metal alkylidene reactable with cycloalkenes or dienes. In some embodiments, the detection functionality comprises a metal alkylidyne reactable with cycloalkynes or diynes. In some embodiments, the detection functionality comprises a metalocene or copper radical transfer catalyst reactable with alkenes.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
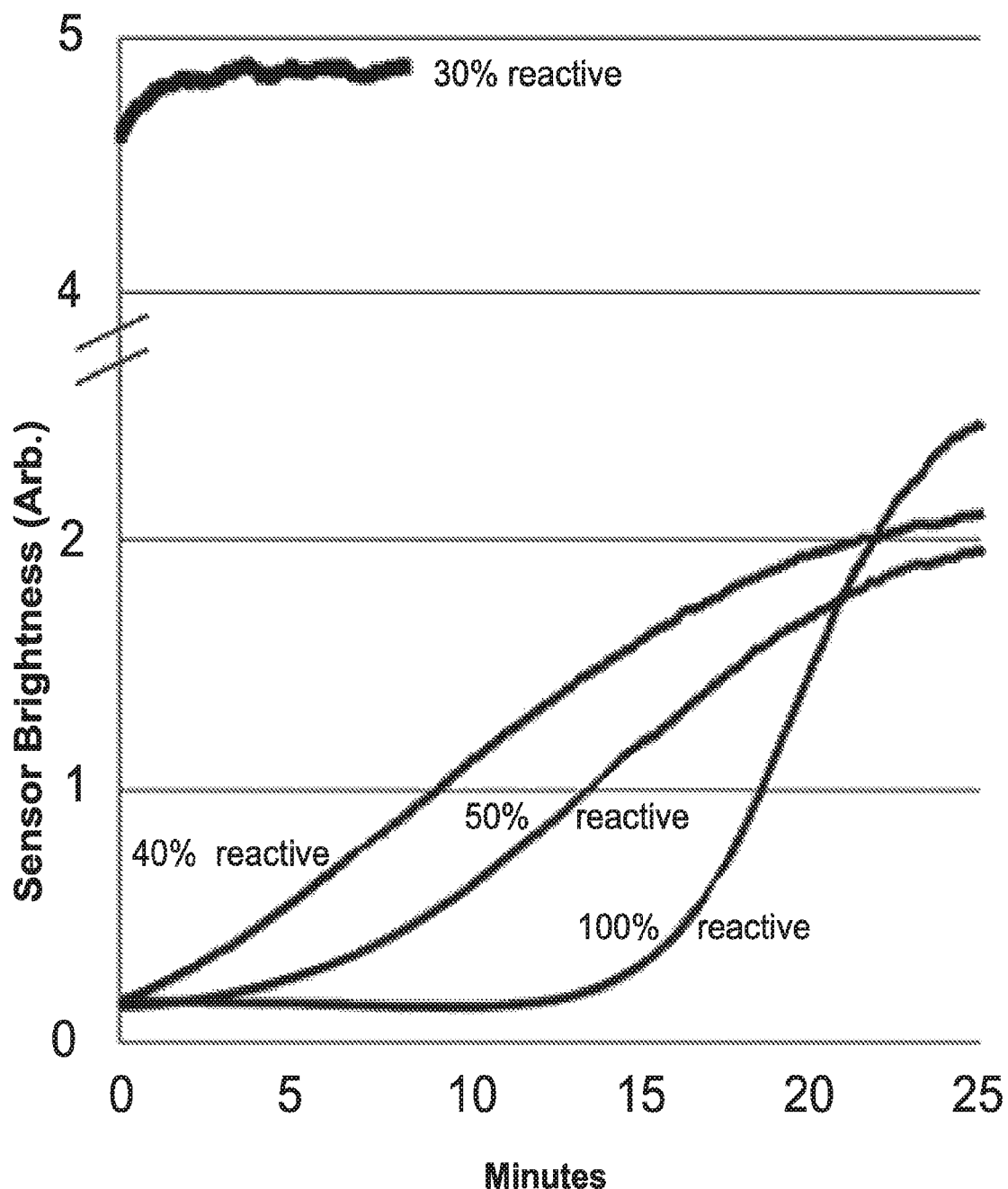
FIG. 1 is a plot showing the response of an embodiment of a liquid crystal sensor to 1 ppm $NO_2$. The density of detection functionalities on the substrate surface was controlled by varying the relative number of substrate sites that were occupied by detection functionalities. Embodiments of the sensor were produced from solutions comprising 30%, 40%, 50%, and 100% of the reactive detection functionality and the other portion being a non-reactive functionality to act as a spacer. The 30% reactive chemistry did not align the LC homeotropic initially.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Accordingly, provided herein is a LC sensor technology based on separating LC alignment from analyte detection. In this detailed description of the various embodiments of the LC technology, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein. The section headings used herein are for organizational purposes only and are not to be construed as limiting the described subject matter in any way.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control.

1. Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the term "wavefront" refers to a line of demarcation that is observable between a region of liquid crystal in one orientation and a region of liquid crystal in a second, different orientation. In many cases, the wavefront is visually detectable. However, the location of the wavefront can also be detected by image analysis procedures.

As used herein, the term "ligand" refers to any molecules that bind to or can be bound by another molecule.

As used herein, the term "detection region" refers to a discrete area that is designated for detection of an analyte in a sample.

As used herein, the terms "material" and "materials" refer to, in their broadest sense, any composition of matter.

As used herein, the term "field testing" refers to testing that occurs outside of a laboratory environment. Such testing can occur indoors or outdoors at, for example, a worksite, a place of business, public or private land, or in a vehicle.

As used herein, the term "nanostructure" refers to a microscopic structure, typically measured on a nanometer scale. Such structures include various three-dimensional assemblies including, but not limited to, liposomes; films; multilayers; braided, lamellar, helical, tubular, and fiber-like shapes; and combinations thereof. Such structures can, in some embodiments, exist as solvated polymers in aggregate forms such as rods and coils. Such structures can also be formed from inorganic materials, such as prepared by the physical deposition of a gold film onto the surface of a solid, proteins immobilized on surfaces that have been mechanically rubbed, and polymeric materials that have been molded or imprinted with topography by using a silicon template prepared by electron beam lithography.

As used herein, the term "self-assembling monomers" refers to molecules that spontaneously associate to form molecular assemblies. In one sense, this can refer to surfactant molecules that associate to form surfactant molecular assemblies. The term "self-assembling monomers" includes single molecules and small molecular assemblies, whereby the individual small molecular assemblies can be further aggregated (e.g., assembled and polymerized) into larger molecular assemblies.

As used herein, the term "linker" refers to material that links one entity to another. In one sense, a molecule or molecular group can be a linker that is covalent attached to two or more other molecules (e.g., linking a ligand to a self-assembling monomer).

As used herein, the term "bond" refers to the linkage between atoms in molecules and between ions and molecules in crystals. The term "single bond" refers to a bond with two electrons occupying the bonding orbital. Single bonds between atoms in molecular notations are represented by a single line drawn between two atoms (e.g., C—C). The term "double bond" refers to a bond that shares two electron pairs. Double bonds are stronger than single bonds and are more reactive. The term "triple bond" refers to the sharing of three electron pairs. As used herein, the term "ene-yne" refers to alternating double and triple bonds. As used herein the terms "amine bond", "thiol bond", and "aldehyde bond" refer to any bond formed between an amine group (e.g., a chemical group derived from ammonia by replacement of one or more of its hydrogen atoms by hydrocarbon groups), a thiol group (e.g., sulfur analogs of alcohols), and an aldehyde group (e.g., the chemical group —CHO joined directly onto another carbon atom), respectively, and another atom or molecule.

As used herein, the term "covalent bond" refers to the linkage of two atoms by the sharing of two electrons, one contributed by each of the atoms.

As used herein, the terms "optical anisotropy" and "birefringence" refer to the optical property of having a refractive index that depends on the polarization and propagation direction of light. Optically anisotropic materials are said to be birefringent. The anisotropy in optical properties of liquid crystals gives rise to optical birefringence, that is, different refractive indices when measured with different polarization directions.

As used herein, the term "magnetic anisotropy" refers to having different magnetic properties for different directions of magnetic fields. Magnetic anisotropy produces different magnetic susceptibilities in a material when measured with different magnetic field directions.

As used herein, the term "dielectric anisotropy" refers to having different dielectric properties for different directions of electric fields. Dielectric anisotropy produces different dielectric constants in a material when measured with different electric field directions.

As used herein, the term "spectrum" refers to the distribution of electromagnetic (e.g., light) energies arranged in order of wavelength.

As used the term "visible spectrum" refers to light radiation that contains wavelengths from approximately 360 nm to approximately 800 nm.

As used herein, the term "substrate" refers to a solid object or surface upon which another material is layered or attached. Solid supports include, but are not limited to, glass, metals, gels, and filter paper, among others.

As used herein, the terms "array" and "patterned array" refer to an arrangement of elements (e.g., entities) onto or into a material or device. For example, depositing several types of liquid crystals into discrete regions on an analyte-detecting device would constitute an array.

As used herein, the term "in situ" refers to processes, events, objects, or information that are present or take place within the context of their natural environment.

As used herein, the term "sample" is used in its broadest sense. In one sense it can refer to a biopolymeric material. In another sense, it is meant to include a specimen or culture obtained from any source, as well as biological and environmental samples. Biological samples may be obtained from animals (including humans) and encompass fluids, solids, tissues, and gases. Biological samples include blood products, such as plasma, serum and the like. Environmental samples include environmental material such as air, gas, atmosphere, vapor, headspace, surface matter, soil, water, crystals, and industrial samples. These examples are not to be construed as limiting the sample types applicable to the present technology.

As used herein, the term "liquid crystal" ("LC") refers to a thermodynamic stable phase characterized by anisotropy of properties without the existence of a three-dimensional crystal lattice, generally lying in the temperature range between the solid and isotropic liquid phase.

As used herein, the term "state" when referring to a liquid crystal refers, without limitation, to an alignment, orientation, phase, arrangement, etc. of the liquid crystal. The terms alignment, orientation, phase, and arrangement are not exclusive and a liquid crystal can be described in a state by combinations of these (and other) terms describing, e.g., the alignment, orientation, phase, arrangement, twist, etc. of the liquid crystal.

As used herein, the term "mesogen" refers to compounds that form liquid crystals, including rod-like or disc-like molecules that are components of liquid crystalline materials.

As used herein, "thermotropic liquid crystal" refers to liquid crystals that result from the melting of mesogenic solids due to an increase in temperature. Both pure substances and mixtures form thermotropic liquid crystals.

"Lyotropic," as used herein, refers to molecules that form phases with orientational and/or positional order in a solvent. Lyotropic liquid crystals can be formed using amphiphilic molecules (e.g., sodium laurate, phosphatidylethanolamine, lecithin). The solvent can be water.

"Metallotropic," as used herein, refers to metal complexes of organic ligands that exhibit liquid crystalline character. Thermotropic metallomesogens have been made that incorporate many metals. They can be rodlike (calamitic) and disklike (discotic). The ligand can be monodentate (e.g., 4-substituted pyridines), bidentate (e.g., beta-diketonates, dithiolenes, carboxylates, cyclometalated aromatic amines), or polydentate (e.g., phthalocyanines, porphyrins). The ligands influence the mesophase character based on molecular shape and intermolecular forces. The metallomesogens provide a rigid core, which is typically unsaturated and either rod- or disklike in shape, and several long hydrocarbon tails where the metal atom is usually at or near the center of gravity of the molecule. Metallotropic liquid crystals, acting through the metal moiety, can be tuned to capture different target analytes by different methods including but not limited to displacement, redox reactions, and ligand formation.

As used herein, the term "heterogenous surface" refers to a surface that orients liquid crystals in at least two separate planes or directions, such as across a gradient.

As used herein, "nematic" refers to liquid crystals in which the long axes of the molecules remain substantially parallel, but the positions of the centers of mass are randomly distributed. Nematic liquid crystals can be substantially oriented by a nearby surface.

"Twisted" or "twisted nematic," as used herein, refers to liquid crystals that are biaxial nematics, meaning that in addition to orienting their long axis, they also orient along a secondary axis (e.g., the phase exhibits a twisting of the molecules perpendicular to the director, with the molecular axis parallel to the director). Thus, instead of the director being held locally constant as is the case for nematics, the director rotates in a helical fashion throughout the sample.

"Chiral", "chiral nematic," or "cholesteric", as used herein, refers to liquid crystals in which the mesogens are optically active. As for twisted nematics, the director rotates in a helical fashion throughout the sample. Chiral nematic crystals show a strong optical activity that is much greater than can be explained solely on the bases of the rotatory power of the individual mesogens. When light equal in wavelength to the pitch of the director impinges on the liquid crystal, the director acts like a diffraction grating, reflecting most and sometimes all light incident on it. If white light is incident on such a material, only one color of light is reflected and it is circularly polarized. This phenomenon is known as selective reflection and is responsible for the iridescent colors produced by chiral nematic crystals.

"Smectic," as used herein, refers to liquid crystals that are distinguished from "nematics" by the presence of a greater degree of positional order in addition to orientational order. In a smectic phase the molecules spend more time in planes and layers than they do between these planes and layers. "Polar smectic" layers occur when the mesogens have permanent dipole moments. In the smectic A2 phase, for example, successive layers show anti ferroelectric order, with the direction of the permanent dipole alternating from layer to layer. If the molecule contains a permanent dipole moment transverse to the long molecular axis, then the chiral smectic phase is ferroelectric. A device utilizing this phase can be intrinsically bistable.

"Frustrated phases," as used herein, refers to another class of phases formed by chiral molecules. These phases are not chiral; however, twist is introduced into the phase by an array of grain boundaries. A cubic lattice of defects (where the director is not defined) exists in a complicated, orientationally ordered twisted structure. The distance between these defects is hundreds of nanometers, so these phases reflect light just as crystals reflect X-rays.

"Discotic phases" are formed from molecules that are disc shaped rather than elongated. Usually these molecules have aromatic cores and six lateral substituents. If the molecules are chiral or a chiral dopant is added to a discotic liquid crystal, a chiral nematic discotic phase can form.

As used herein, the word "presence" or "absence" (or, alternatively, "present or "absent") is used in a relative sense to describe the amount or level of a particular entity (e.g., an analyte). For example, when an analyte is said to be "present" in a test sample, it means the level or amount of this analyte is above a pre-determined threshold; conversely, when an analyte is said to be "absent" in a test sample, it means the level or amount of this analyte is below a pre-determined threshold. The pre-determined threshold may be the threshold for detectability associated with the particular test used to detect the analyte or any other threshold. When an analyte is "detected" in a sample it is "present" in the sample; when an analyte is "not detected" it is "absent" from the sample. Further, a sample in which an analyte is "detected" or in which the analyte is "present" is a sample that is "positive" for the analyte. A sample in which an analyte is "not detected" or in which the analyte is "absent" is a sample that is "negative" for the analyte.

As used herein, an "increase" or a "decrease" refers to a detectable (e.g., measured) positive or negative change in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, "measureable response", "detectable change", and the like refer to a signal that is at least 3 times (3×) of the noise detected for a control sample, e.g., in some embodiments, the signal-to-noise ratio is at least 3.

A "system" denotes a set of components, real or abstract, comprising a whole where each component interacts with or is related to at least one other component within the whole.

The term "alkyl" shall mean straight or branched chain alkanes of one to ten total carbon atoms, or any number within this range (e.g., methyl, ethyl, 1-propyl, 2-propyl, n-butyl, s-butyl, t-butyl, etc.).

As used herein, the term "aryl" refers to a carbocyclic aromatic ring or ring system, e.g., unsubstituted, mono-substituted, or poly-substituted aromatic groups such as phenyl or naphthyl. Unless otherwise specified, aryl groups are from 6 to 18 carbons. Examples of aryl groups include phenyl, naphthyl, biphenyl, fluorenyl, and indenyl groups.

For structural representations where the chirality of a carbon has been left unspecified it is to be presumed by one skilled in the art that either chiral form of that stereocenter is possible.

As used herein, "moiety" refers to one of two or more parts into which something may be divided, such as, for example, the various parts of a molecule, chemical structure, a chemical group, etc.

As used herein, "functionality" refers to an atom, molecule, moiety, side chain, reactive group, etc., or combinations thereof, that performs a function associated with the technology. For example, a "chemical functionality" is an atom, molecule, moiety, side chain, reactive group, etc., or combinations thereof with chemical properties (e.g., comprising one or more of an alignment functionality, a detection functionality; and/or an anchor functionality); an "alignment functionality" is an atom, molecule, moiety, side chain, reactive group, etc., or combinations thereof that interacts with a liquid crystal, e.g., to align the liquid crystal and to cause an orientation change of the liquid crystal; a "detection functionality" is an atom, molecule, moiety, side chain, reactive group, etc., or combinations thereof that interacts with an analyte with appropriate specificity and provides for the detection of the analyte. As used herein, an "analyte interaction" refers to an event when an analyte interacts specifically with a detection functionality to cause a change in state of the detection functionality (e.g., from a first state of the detection functionality to a second state of the detection functionality). In some embodiments, an atom, molecule, moiety, side chain, reactive group, etc., or combinations thereof comprises and/or provides more than one functionality. For example, in some embodiments a molecule may have a detection functionality at one end and an anchoring functionality at the other end. As an additional example, in some embodiments a detection functionality is also an alignment functionality (e.g., the same atom, molecule, moiety, side chain, reactive group, etc., or combination thereof provides both functionalities). In some embodiments, an analyte is a polymerizable analyte and the polymerized analyte acts as an alignment functionality to interact with the liquid crystal. In some embodiments, the analyte is an alignment functionality and/or is a reactant or catalyst in a reaction that produces an alignment functionality.

As used herein, the term "spacer" or "spacer molecule" refers to an atom, molecule, moiety, side chain, reactive group, etc., or combinations thereof that is used to "dilute" a functionality. In some embodiments, a plurality of "spacers" is used with a plurality of molecules having a "functionality", wherein the spacers and the molecules having the functionality are similar except the spacers do not comprise the functionality. For example, in some embodiments comprising a detection functionality anchored to a surface, spacers are anchored to a subset of anchoring sites but do not comprise a detection functionality or do not anchor a detection functionality to the surface. In some embodiments comprising an alignment functionality, a spacer is used that has the same or similar characteristics of the alignment functionality but that does not align a liquid crystal. The ratio of spacer to molecule comprising the functionality can be adjusted to tune the sensitivity of the sensors described herein.

As used herein, "communication" between two or more functionalities refers to an interaction between two or more functionalities such that a change in the first functionality (e.g., a change from a first state of the first functionality to a second state of the first functionality) produces a change in the second functionality (e.g., a change from a first state of the second functionality to a second state of the second functionality). For example and without limitation, two or more functionalities may communicate chemically (e.g., by the formation, breaking, rearrangement, etc. of chemical bonds), physically (e.g., by asserting a force to cause a movement or to cause on acceleration, a change in conformation, etc.), energetically (e.g., by transmission of energy), magnetically (e.g., by magnetic field) photonically (e.g., by the transmission of a photon), or by other modes. Two or more functionalities that are in communication are "communicably linked". In some embodiments, communication is mediated by a third functionality that relays the communication. Furthermore, the term "communication" refers in some embodiments to an interaction between two liquid crystals such that a change from a first state (e.g., first orientation) to a second state (e.g., second orientation) in the first liquid crystal produces a change from a first state (e.g., first orientation) to a second state (e.g., second orientation) in the second liquid crystal. In some embodiments, the term "communication" refers to an interaction between a reactive surface chemistry and a liquid crystal such that a change in the reactive surface chemistry produces a change in the liquid crystal (e.g., from one orientation to another orientation).

As used herein, the term "specific" and "specificity" refer to the interaction of a detection functionality with an analyte. In particular, specificity refers to the ability of a detection functionality to interact with an analyte such that the interaction produces a change in state in the detection functionality. An analyte that interacts with a detection functionality to produce a change in state in the detection analyte is a "detectable analyte". The number of analytes with which a detection functionality can interact is inversely related to specificity, e.g., specificity increases as the number of detectable analytes decreases.

DESCRIPTION

The present technology relates to detecting analytes using a LC assay format and a sensor device utilizing liquid crystals as part of a reporting system. Although the disclosure herein refers to certain illustrated embodiments, it is to be understood that these embodiments are presented by way of example and not by way of limitation.

Liquid crystal-based assay systems and devices (LC assays) are described, e.g., in U.S. Pat. No. 6,284,197, which is incorporated herein by reference; and in U.S. Pat. App. Ser. Nos. 61/779,569 and 61/779,561, each of which is incorporated herein by reference. Further, liquid crystal-based assay systems and devices are described, e.g., in Intl App. Pub. Nos. WO 2001/061357; WO 2001/061325; WO 1999/063329; WO/2014/165196, each of which is incorporated herein by reference; and in publications by Gupta et al. (1998) Science 279: 2077-2080; Kim et al. (2000) "Orientations of Liquid Crystals on Mechanically Rubbed Films of Bovine Serum Albumin: A Possible Substrate for Biomolecular Assays Based on Liquid Crystals" Analytical Chemistry 72: 4646-4653; Skaife et al. (2000) "Quantitative Interpretation of the Optical Textures of Liquid Crystals Caused by Specific Binding of Immunoglobulins to Surface-Bound Antigens" Langmuir 16: 3529-3536; Gupta et al. (1999) "Using Droplets of Nematic Liquid Crystal To Probe the Microscopic and Mesoscopic Structure of Organic Surfaces" Langmuir 15: 7213-7223; and Shah et al. (2001) "Principals for Measurement of Chemical Exposure Based on Recognition-Driven Anchoring Transitions in Liquid Crystals" Science 293: 1296-99, each of which is incorporated herein by reference.

In particular, U.S. Pat. No. 6,284,197 and Shah et al, supra, describe the detection of chemical molecules with a liquid crystal assay format that relies on an orientational change in the LC following the interaction of the chemical molecules with a functionalized surface on which the LC has been overlaid.

Liquid Crystal Sensors

In general, a LC-based sensor is made by spreading a thin film of LC over a chemically functionalized surface that aligns the LC molecules in one orientation. After interaction with the analyte, the LC alignment changes which can be detected in some embodiments as a change in brightness when viewed through crossed polarizers.

In some embodiments, the detection of analytes or their derivatives is accomplished through a direct interaction of the analyte with the LC. Depending upon the target analyte, some embodiments provide LCs that are synthesized to have a functional group that specifically interacts or reacts with the analyte. The liquid crystal can either be supported on a surface or in a small bulk amount through which the analyte is passed. The present technology is not limited to the detection of any particular analyte. Indeed, the detection of a variety of analytes is contemplated. Exemplary analytes are nitric oxide, formaldehyde, and hydrogen sulfide.

In some embodiments, the analyte produces a change in the orientation, geometry, length, etc. of a molecule to produce an alignment functionality. For instance, in some embodiments the analyte produces a synthetic reaction that lengthens a molecule to produce an alignment functionality, e.g., to produce an alignment functionality having a geometry or a length sufficient to align the LC. In some embodiments, the analyte is a reactant in a synthetic reaction that produces an alignment functionality, e.g., the analyte reacts with a molecule of the sensor to produce an alignment functionality that aligns the LC. In some embodiments, synthesis of the alignment functionality (e.g., in situ in the sensor) results from addition of the analyte.

In some embodiments, the analyte attaches to a molecule, moiety, side chain, functional group, etc. to produce an alignment functionality. In some embodiments, production of an alignment functionality by the analyte comprises introduction of one or more molecules (e.g., one or more analytes) into the sensor. In some embodiments, the analyte catalyzes the linking of molecules present in the sensor to produce an alignment functionality. In some embodiments, the analyte is an alignment functionality, e.g., in some embodiments the analyte is captured by the sensor (e.g., by a detection functionality) and the captured analyte aligns the LC.

In some embodiments, the LC molecules are oriented on a chemically functionalized surface having a surface chemistry that is known to interact with the target analytes. When the sensor surface is exposed to a test environment, the analyte diffuses through the LC film and interacts with the surface chemistry. As a result, the orientation of the LC on the modified surface changes, thus producing a change in the optical properties of the LC film.

In some embodiments, the LC sensor comprises an LC film that is supported by a single chemically functionalized surface (e.g., the sensor comprises one chemically functionalized surface and one non-functionalized surface) and the whole LC film is exposed to the test environment. Upon exposure, the analyte molecules diffuse through the LC film and bind to the surface chemistry and the LC molecules change orientation. As a result, the optical properties and appearance of the LC film change in real time. Depending on the surface chemistry and analyte combination, the response can be reversible or irreversible (e.g., when the reactive surface chemistry is irreversible under exposure conditions). This embodiment allows for the sensitive detection of analytes. In some embodiments, the dynamic response of the sensor is monitored by measuring the response time (e.g., the time it takes for the sensor to respond). The response time is a function of the concentration of the analyte and is used as a parameter to assess the quantitative response of the sensor.

Some embodiments utilize a thin film of LC supported between two chemically functionalized surfaces with openings from one or more sides of the sensor. When the monitor is exposed to the test environment, the analyte now will have to diffuse from the side of the sensor (as opposed to from the top of the LC film). Therefore, only the cross-section of the LC film is exposed to the test environment. As the analyte diffuses across the film, it interacts with the surface chemistry, thereby inducing a change in the orientation of the LC. This change appears as a bright front on the sides of the sensor open to the test environment that propagates inward into the LC film as the exposure time increases. A measurable response is obtained after macroscopic lateral diffusion of the analytes through the LC film Sensors Comprising Separate Detection and Alignment Functionalities Some embodiments relate to a LC sensor in which the alignment functionality and the detection functionality are provided by two independent and separate moieties, functional groups, chemical functionalities, etc. For instance, in some embodiments the alignment functionality and the detection functionality are provided by two independent and separate molecules (e.g., a first molecule and a second molecule; e.g., a first chemical functionality and a second chemical functionality). In some embodiments, the alignment functionality and the detection functionality are provided by two independent and separate moieties, functional groups, chemical functionalities, etc. on the same molecule, e.g., some embodiments relate to a LC sensor in which the alignment functionality and the detection functionality are provided by two parts of one molecule.

Some embodiments further comprise an anchor functionality. The alignment functionality interacts with the LC; the detection functionality interacts with the analyte; the anchor functionality attaches the alignment functionality and/or the detection functionality to a substrate. Interaction of the analyte with the detection functionality causes a change in the detection functionality; the change in the detection functionality is communicated to the alignment functionality; and, the change in the alignment functionality causes a change in the LC, which produces a detectable signal indicating the presence of the analyte.

Alignment Functionality

The alignment functionality interacts with the LC such that a change in the alignment functionality effects an orientation change in the LC. In some embodiments, the alignment functionality can have two states. In some embodiments, the first state effects a first orientation in the LC and the second state effects a second orientation in the LC. In some embodiments, the first state aligns the LC homeotropically and a second state causes a disruption in the homeotropic alignment of the LC to produce a planar alignment. The orientation change of the LC, e.g., from the aligned to the non-aligned state or from the non-aligned to the aligned state, produces a detectable signal or a change in a detectable (e.g., observable, measurable, and/or recordable) property of the LC.

In some embodiments, the first state aligns the LC in a first aligned state (e.g., in a first direction) and the second state aligns the LC in a second aligned state (e.g., in a second direction) that is detectably different than the first aligned state. The change of the LC from the first aligned state to the second aligned state or from the second aligned to the first aligned state produces a detectable signal or a change in a detectable (e.g., observable, measurable, and/or recordable) property of the LC.

The two states of the alignment functionality can be, e.g., a first conformation and a second conformation, presence and absence, a first bonded state and a second bonded state, mobile and static, charged and uncharged, etc.

Further, the aligned state does not necessarily comprise all LC molecules in alignment but may be sufficiently or substantially aligned such that the aligned state can be detected relative to the non-aligned state. Also, the non-aligned state does not necessarily comprise all LC in non-alignment but may be sufficiently or substantially aligned such that the non-aligned state can be detected relative to the aligned state. That is, the aligned and non-aligned states are not necessarily totally aligned and/or totally non-aligned, respectively; accordingly, the aligned and non-aligned states have sufficient differences in the extent of alignment such that the change from aligned state to non-aligned state and/or from non-aligned state to aligned state is detectable (e.g., produces a detectable signal or a change in a detectable (e.g., observable, measurable, and/or recordable) property of the LC).

The technology is not limited in the type of alignment functionality used in the sensor, e.g., the alignment functionality can be any molecule, chemical, side chain, moiety, modification, reactive (R) group, etc. that aligns an LC. An alignment functionality that aligns a first LC may not necessarily align a second LC; accordingly, the skilled artisan can choose appropriate pairs of an LC and an alignment functionality such that the alignment functionality interacts with and aligns the LC as is appropriate for the embodiment of the sensor comprising the LC and the alignment functionality.

In some embodiments, the alignment functionality is an aliphatic molecule (e.g., an alkane). In some embodiments, the alignment functionality is an aromatic molecule (e.g., a molecule having one or more conjugated aromatic rings). In some embodiments, the alignment functionality is a molecule with one or more aromatic rings and an aliphatic chain. In some embodiments, the alignment functionality is charged or has a polarized electron density distribution. Particular alignment functionalities that find use in embodiments of the technology include, but are not limited to: stearate, octadecyl, 4-hexyl-biphenyl, 4-cyclohexylphenyl, trialkylboranes, alkylboranes trialkylborates.

Moreover, the technology is not limited in the interaction between the alignment functionality and the LC. In some embodiments, the alignment functionality and the LC interact through coordination, metal-ligand interaction, Van der Waals forces, hydrophobic interactions, ionic interactions, hydrogen bonding, dipole-dipole interaction, chemical bonding, electrostatic interactions, magnetic interactions, and/or by aromatic ring stacking. In some embodiments, the alignment functionality and the LC interact through an antibody-antigen interaction, an aptamer-target interaction, an avidin-biotin interaction, a receptor-ligand interaction; a monomer-monomer interaction (e.g., polymerization, e.g., dimerization, trimerization, etc.); an enzyme-substrate interaction, and/or a metal-chelator (e.g., a crown ether, etc.) interaction. In some embodiments, the LC and the alignment functionality comprise complementary nucleic acids that hybridize to each other.

In some embodiments, the LC comprises a functional group with which the alignment functionality interacts. In some embodiments, the functional group is present on the LC and in some embodiments the LC is chemically modified to attach the functional group to the LC.

In some embodiments, the alignment functionality is provided by a polymerized analyte. That is, in some embodiments, the analyte enters the sensor and polymerizes within the sensor. The polymerized chain of analyte interacts with the liquid crystal to effect a orientation change in the liquid crystal that produces a detectable signal or a change in a detectable signal.

In some embodiments, the analyte produces a change in the orientation, geometry, length, etc. of a molecule to produce an alignment functionality. For instance, in some embodiments the analyte produces a synthetic reaction that lengthens a molecule to produce an alignment functionality, e.g., to produce an alignment functionality having a geometry or a length sufficient to align the LC. In some embodiments, the analyte is a reactant in a synthetic reaction that produces an alignment functionality, e.g., the analyte reacts with a molecule of the sensor to produce an alignment functionality that aligns the LC. In some embodiments, synthesis of the alignment functionality (e.g., in situ in the sensor) results from addition of the analyte.

In some embodiments, the analyte attaches to a molecule, moiety, side chain, functional group, etc. to produce an alignment functionality. In some embodiments, production of an alignment functionality by the analyte comprises introduction of one or more molecules (e.g., one or more analytes) into the sensor. In some embodiments, the analyte catalyzes the linking of molecules present in the sensor to produce an alignment functionality. In some embodiments, the analyte is an alignment functionality, e.g., in some embodiments the analyte is captured by the sensor (e.g., by a detection functionality) and the captured analyte aligns the LC.

Detection Functionalities

The technology includes a wide variety of LC sensors utilizing the interactions between the detection functionality and the analyte. Accordingly, the choice of a detection functionality is based on the analyte that is targeted for detection and includes considerations such as the sensitivity of the detection functionality for the analyte, the specificity of the detection functionality for the analyte, the mode of interaction between the detection functionality and the analyte, etc. In some embodiments, the detection functionality interacts with the analyte, e.g., by chemical reaction, metal-ligand coordination interaction, dipole-dipole interactions (e.g., by changes in the polarity of the detection functionality environment), etc. Any detection functionality can be used provided that it interacts with the analyte with sufficient sensitivity and/or specificity and can communicate the interaction to the alignment functionality.

In some embodiments, the interaction between the analyte and the detection functionality depends on an active functional group present in the detection functionality. For instance, in some embodiments the particular detection mechanism comprises acid-base chemistry, oxidation-reduction chemistry, substitution reaction chemistry, or combinations thereof at a functional group of the detection functionality.

The interaction of the target analyte with the detection functionality produces a change in the physical properties of the LC (e.g., change in phase, optical birefringence, dielectric anisotropy, magnetic isotropy, orientation, etc.) via communication of the interaction to the alignment functionality that can be detected using a variety of instruments capable of detecting these physical changes in the LC.

The technology is not limited in the type of detection functionality used in the sensor, e.g., the detection functionality can be any molecule, chemical, side chain, moiety, modification, reactive (R) group, etc. that interacts with an analyte with the appropriate specificity and/or sensitivity and communicates the interaction to the alignment functionality. In some embodiments, particular detection functionalities that find use include but are not limited to, e.g., metals, dithiocarbamates, amines, ammonium salts, hydrazines, oximes, amidinates, guanidinates, carboxylic acids, sulfonic acids, aldehydes, ketones, cyclopentadienes, pyrroles, pyridines, furans, alkenes, alkynes, amides, acid halides, anhydrides, phenols, thiols, alcohols, ethers, esters, carbonates, imides, ureas, and urethanes.

Moreover, the technology is not limited in the interaction between the detection functionality and the analyte. In some embodiments, the detection functionality and the analyte interact through coordination, metal-ligand interaction, Van der Waals forces, hydrophobic interactions, ionic interactions, hydrogen bonding, dipole-dipole interaction, chemical bonding, electrostatic interactions, magnetic interactions, and/or by aromatic ring stacking. In some embodiments, the detection functionality and the analyte interact through an antibody-antigen interaction, an aptamer-target interaction, an avidin-biotin interaction, a receptor-ligand interaction; a monomer-monomer interaction (e.g., polymerization, e.g., dimerization, trimerization, etc.); an enzyme-substrate interaction, and/or a metal-chelator (e.g., a crown ether, etc.) interaction. In some embodiments, the analyte and the detection functionality comprise complementary nucleic acids that hybridize to each other.

In some embodiments, the detection functionality comprises a functional group with which the analyte interacts. In some embodiments, the functional group is present on the detection functionality and in some embodiments the detection functionality is chemically modified to attach the functional group to the detection functionality.

Types of Communication from Detection Functionality to Alignment Functionality

The sensor technology comprises a functionality that aligns LCs (e.g., an alignment functionality that interacts with the LC) and a separate functionality that detects the analyte (e.g., a detection functionality that interacts with the analyte). Upon interacting with the analyte, the detection functionality communicates the detection of the analyte to the alignment functionality, which further causes a change in the alignment of the LC. The change in the LC produces a detectable signal associated with analyte detection.

The technology is not limited in the type of communication between the detection functionality and the alignment functionality provided that a change in the detection functionality produces a change in the alignment functionality. In some embodiments, the alignment functionality can exist in two states, the detection functionality can exist in two states, and a change in the state of the detection functionality (e.g., a change from a first detection state to a second detection state) effects a change in the state of the alignment functionality (e.g., a change from a first alignment state to a second alignment state). The change in state of the detection functionality is communicated to the alignment functionality to produce the change in the state of the alignment functionality. In various embodiments of the technology, the communication between the detection functionality and the alignment functionality occurs by different modes. For example, embodiments comprise communication between the detection functionality and the alignment functionality that is based on a chemical process (e.g., by the formation, breaking, rearrangement, isomerization, etc. of chemical bonds; by a change in coordination; by a change in an ionic charge or electron density distribution; by a change in redox state; etc.), physically (e.g., by exerting a force to cause a movement or to cause an acceleration), energetically (e.g., by transmission of energy), photonically (e.g., by the transmission of a photon), magnetically (e.g., by the creation, cessation, or change in a magnetic field), electrically (e.g., by the creation, cessation, or change in an electric field, e.g., by the movement of a charge (e.g., one or more electrons or protons)), by other modes, and/or by a combination of modes.

Figure 3:
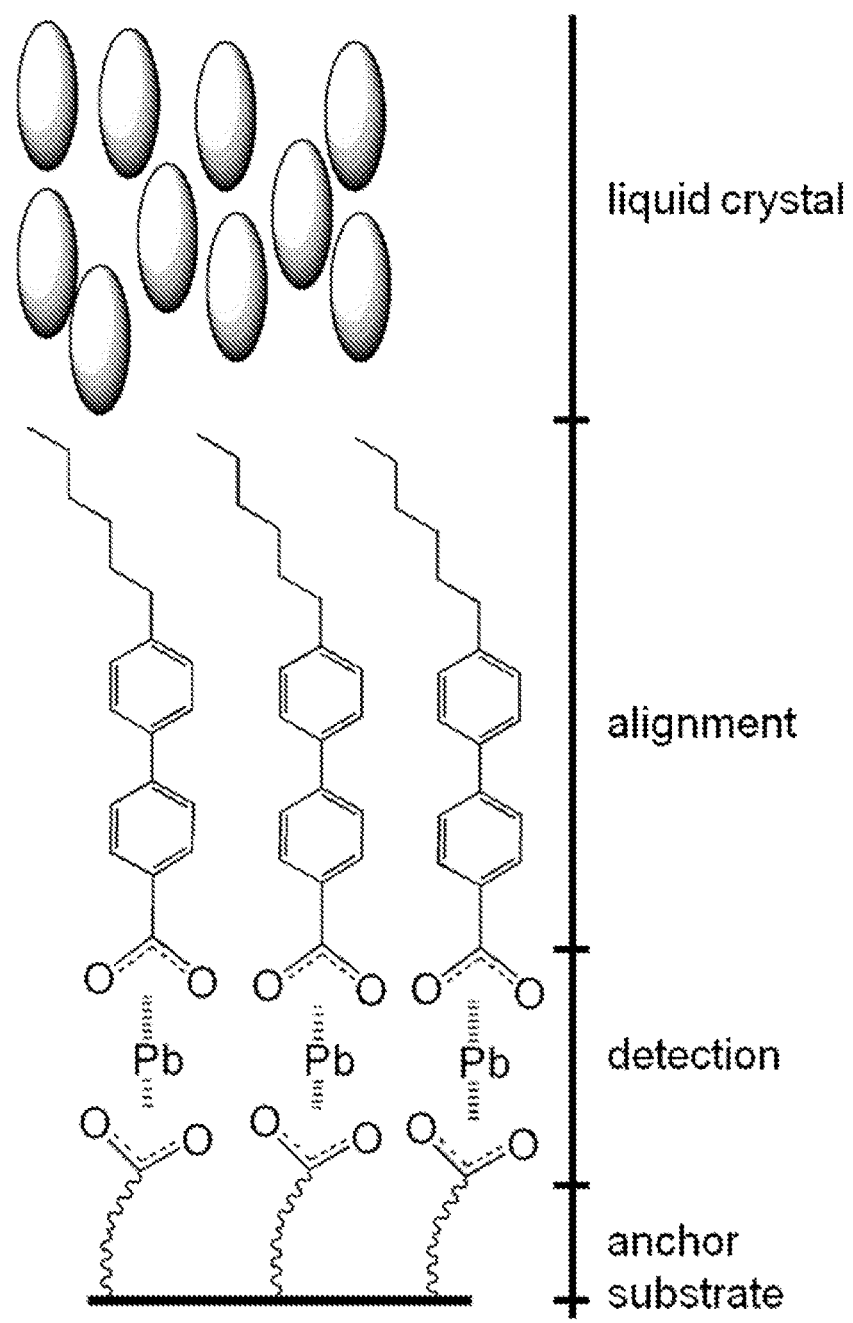
FIG. 3 is a schematic drawing showing a particular embodiment of a sensor that was tested during the development of embodiments of the technology provided herein.
Figure 4:
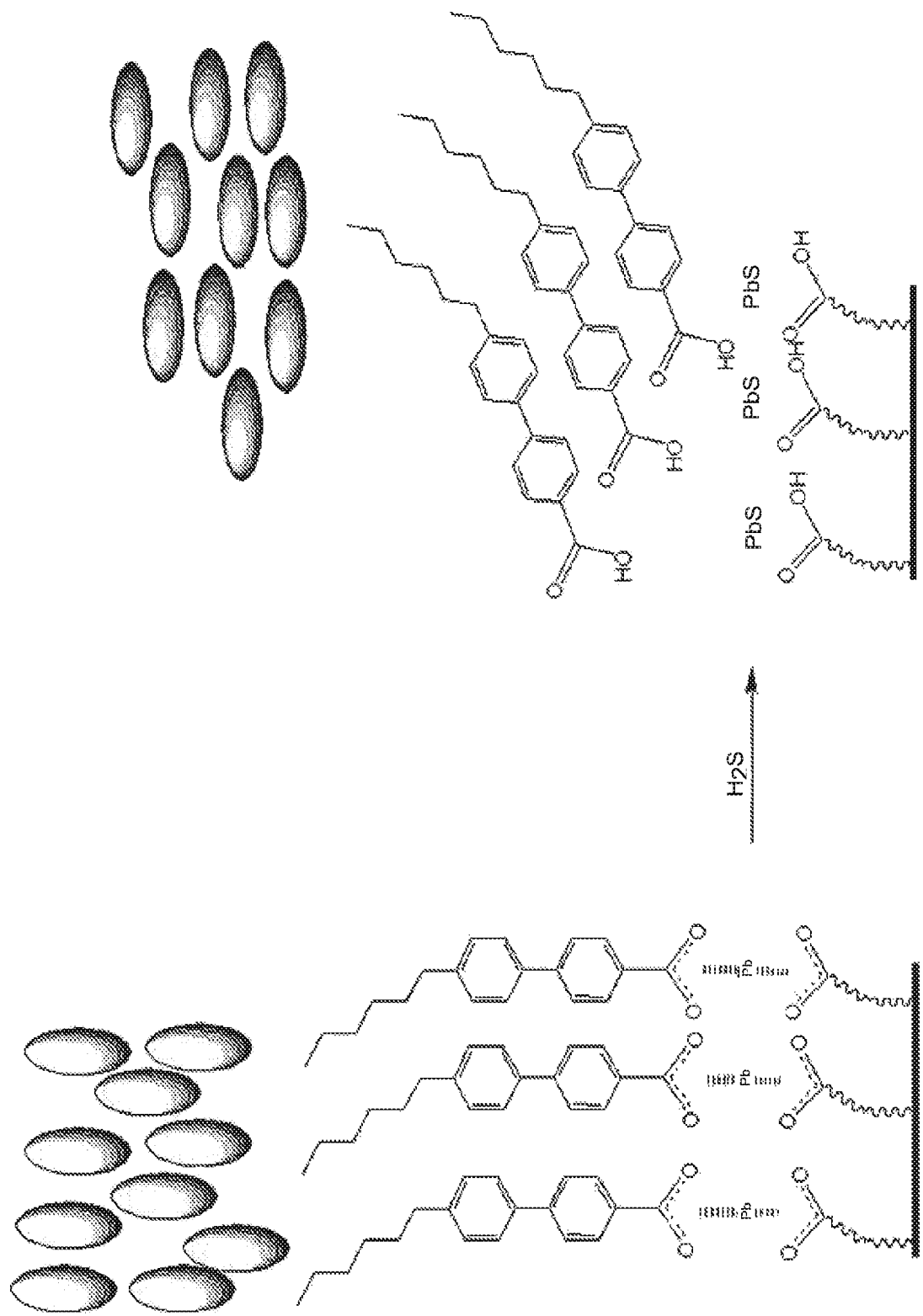
FIG. 4 is a schematic drawing showing the response to analyte (e.g., $H_2S$) of the embodiment of the sensor shown in FIG. 3.

For example, in some embodiments a change in state of the detection functionality causes the detection functionality to fluoresce and emit a photon; subsequently, the photon is absorbed by the alignment functionality, which causes isomerization of a bond (e.g., from a cis double bond to a trans double bond or from a trans double bond to a cis double bond) and thus effects a change in state of the alignment functionality (e.g., a combination of a photonic process and a chemical process). In some embodiments, a change in state of the detection functionality causes a change in the coordination state of the detection functionality and the alignment functionality; the change in coordination state of the alignment functionality effects a movement of the alignment functionality (e.g., a combination of a chemical process and a physical process). See, e.g., Example 2, FIG. 3, and FIG. 4.

Anchor Functionalities

Some embodiments of the technology comprise an anchor functionality, e.g., to attach a detection functionality and/or an alignment functionality to a substrate. Accordingly, the choice of an anchor functionality is based on one or more considerations such as the substrate used for the sensor; the presence of functional groups attached to the substrate for interaction with the anchor functionality; functional groups provided on the detection functionality and/or the alignment functionality for interaction with the anchor functionality; mode of interaction of the anchor functionality with the substrate, substrate functional groups, detection functionality, and/or the alignment functionality, etc.

The technology is not limited in the type of anchor functionality used in the sensor, e.g., the anchor functionality can be any molecule, chemical, side chain, moiety, modification, reactive (R) group, etc. that attaches the detection functionality and/or the alignment functionality to the substrate.

For instance, in some embodiments, the anchor functionality and one or more of the substrate, substrate functional groups, alignment functionality, and/or detection functionality interact through coordination, metal-ligand interaction, Van der Waals forces, hydrophobic interactions, ionic interactions, hydrogen bonding, dipole-dipole interaction, chemical bonding, electrostatic interactions, magnetic interactions, and/or by aromatic ring stacking. In some embodiments, the anchor functionality and one or more of the substrate, substrate functional groups, alignment functionality, and/or detection functionality interact through an antibody-antigen interaction, an aptamer-target interaction, an avidin-biotin interaction, a receptor-ligand interaction, a monomer-monomer interaction (e.g., polymerization, e.g., dimerization, trimerization, etc.), an enzyme-substrate interaction, and/or a metal-chelator (e.g., a crown ether, etc.) interaction. In some embodiments, the analyte and the detection functionality comprise complementary nucleic acids that hybridize to each other.

In some embodiments, the anchor functionality is chemically bonded to the substrate. For example, embodiments of the technology comprise an anchor functionality comprising a thiol (e.g., for attaching the anchor functionality to a substrate comprising gold), embodiments of the technology comprise an anchor functionality that comprises a silane (e.g., for attaching the anchor functionality to a substrate comprising glass or metal oxide), and embodiments of the technology comprise an anchor functionality that comprises a sulfonic, phosphonic, phosphoric, or carboxylic acid (e.g., for attaching the anchor functionality to a substrate comprising glass or metal oxides such as titanium oxide, aluminum oxide, tantalum oxide, or zirconium oxide).

In some embodiments, the substrate, anchor functionality, alignment functionality, and/or detection functionality comprise functional groups that provide for a specific interaction of the substrate with the anchor functionality and/or interaction of the anchor functionality with the alignment functionality and/or the detection functionality.

Liquid Crystals/Mesogens

The technology is not limited in the LC used for the sensor. Indeed, separating the alignment functionality from the detection functionality broadens the range of LC available for use in the sensors relative to existing technology. The technology provides various embodiments in which any extant or yet discovered LC is used according to the technology as it is described herein. Any compound or mixture of compounds that forms a mesogenic layer can be used in conjunction with the present technology. The mesogen can form a layer that is continuous or a layer that is patterned. The mesogens can form thermotropic or lyotropic liquid crystals. In some embodiments, the LC comprises a cyano group and in some embodiments the LC does not comprise a cyano group. In some embodiments, the LC comprises a mixture of LC comprising a cyano group and LC not comprising a cyano group.

For example, nearly any thermotropic liquid crystal can be used, including fluorinated liquid crystals. Fluorinated liquid crystals can be used because the alignment functionality enables alignment of liquid crystal by means other than coordination. In some embodiments, fluorinated liquid crystals have advantages over cyano-based liquid crystals, including but not limited to having wide nematic temperature ranges and exceptional chemical stability. Fluorinated liquid crystals can be highly hydrophobic with potential to resist humidity. The increased temperature range not only increases the operating range of the sensor, but also reduces the amount of variation in responsivity with temperature. Thus, in some embodiments the sensors comprise a fluorinated LC.

Separating the liquid crystal alignment functionality from the analyte detection functionality reduces the requirements on the liquid crystal. For example, the technology is not limited to only those liquid crystals with certain functional groups that interact with target chemistries.

For example, in some embodiments, the LC comprises a compound comprising a Schiff base. In some embodiments, the compound is a diazo compound, an azoxy compound, a nitrone, a stilbene, a tolan, an ester, or a biphenyl. For example, in some embodiments, the LC comprises a compound according to the structure:

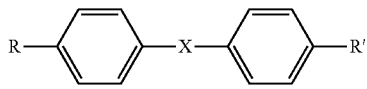

wherein R and R' are independently selected from alkyl, lower alkyl, substituted alkyl, aryl groups, acyl, halogens, hydroxy, cyano, amino, alkoxy, alkylamino, acylamino, thioamido, acyloxy, aryloxy, aryloxyalkyl, mercapto, thia, aza, oxo, saturated cyclic hydrocarbon, unsaturated cyclic hydrocarbons, heterocycle, arylalkyl, substituted aryl, alkylhalo, acylamino, mercapto, substituted arylalkyl, heteroaryl, heteroarylalkyl, substituted heteroaryl, substituted heteroarylalkyl, substituted heterocyclic, and heterocyclicalkyl. In some embodiments, X is selected from $C_1$ to $C_{10}$, —C=N—, —N=N—, —N=N(O)—, C=N(O)=N(O)—, —CH=NO—, —HC=CH—, —C≡C—, and —OC(O)—.

In some embodiments the LC is a nematic LC (e.g., E7) and in some embodiments the LC is a smectic liquid crystal (e.g., 8CB). Additional examples of liquid crystals, include, but are not limited to, 4-cyano-4'-pentylbiphenyl (5CB) and 7CB. A large listing of suitable liquid crystals is presented in "Handbook of Liquid Crystal Research" by Peter J. Collings and Jay S. Patel, Oxford University Press, 1997, ISBN 0-19-508442-X, incorporated herein by reference.

The technology comprises use of polymeric liquid crystals in some embodiments. In some embodiments, the LC is a cholesteric liquid crystal and in some embodiments the LC is a ferroelectric liquid crystal. In some embodiments, the LC is smectic C, smectic C*, a blue phase, and/or a smectic A LC. It is further envisioned that LCs useful in embodiments of the technology may further include additions of dopants such as, but not limited to, chiral dopants as described by Shitara H, et al. (Chemistry Letters 3: 261-262 (1998)) and Pape, M., et al. (Molecular Crystals and Liquid Crystals 307: 155-173 (1997)), each of which is included herein by reference in its entirety. The introduction of a dopant permits manipulation of the liquid crystal's characteristics including, but not limited to, the torque transmitted by the liquid crystal and electrical properties.

In some embodiments, the liquid crystals may preferably be selected from MBBA (N-(4-Methoxybenzylidene)-4-butylaniline), EBBA (4-ethoxybenzylidene-4'-n-butylaniline), E7 (mixture of 5CB (4-cyano-4'-n-pentyl-biphenyl), 7CB (4-cyano-4'-n-heptyl-biphenyl), 8OCB (4-cyano-4'-n-oxyoctyl-biphenyl), 5CT (4-cyano-4"-n-pentyl-p-terphenyl, MLC-6812, MLC 12200, 5CB (4-n-pentyl-4'-cyanobiphenyl), 8CB (4-cyano-4'octylbiphenyl) and 4-(trans-4-heptyl-cyclohexyl)-aniline, 6CB (4-n-hexyl-4'-cyanobiphenyl), MLC-3016, MLC-15700, MLC-2080, MLC-2081, ZLI-4792, MLC-6466, MLC-7800, ZLI-5070, MLC-6080, MLC-6812, MLC-12200-100, ZLI-2248, MLC-14200, ZLI-1557, ZLI-3950, ZLI-811, MDA-00-472, ZLI-1221, ZLI-3497-100, K15, MLC-12000, MLC-6466 ZLI-811, MLC-6468, MLC-6710, ZLI-3103, ZLI-2293, ZLI-2222-100, ZLI-4431 TL-205

A number of LCs with different functional moieties is commercially available. Some of these LCs have suitable reactive moieties that are selective for some target analytes. For example, MBBA (N-(4-methoxybenzylidene)-4-butylaniline and EBBA (N-(4-ethoxybenzylidene)-4-butylaniline) have functional groups similar to the aniline group that can be used for detecting nitrate-based gases. A number of azomethine-type LCs (see, e.g., Hioki et al. (2004) Tetrahedron Letters 45: 7591-7594), polyaniline-based polymers (J. Phys. Chem. B 108: 8894-8899), and polyaniline-based moieties and polyimides (Journal of Polymer Science: Part A: Polymer Chemistry 40: 1583-1593) have been synthesized. The interaction between the analyte and the LC can be physical in nature or based on a chemical reaction. The interaction of the target analyte with the LC can manifest as a change in a physical property of the LC (e.g., a change in the phase transition temperature, optical birefringence, dielectric anisotropy, magnetic anisotropy, or a change in the orientation of the LC on a surface) that can be detected using a variety of instruments capable of detecting these physical changes.

Any compound or mixture of compounds that forms a mesogenic layer can be used in conjunction with the present technology. The mesogens can form thermotropic, lyotropic, metallotropic, or cholesteric liquid crystals. The thermotropic, lyotropic, metallotropic, and cholesteric liquid crystals can exist in a number of forms including nematic, isotropic, chiral nematic, smectic, polar smectic, chiral smectic, frustrated phases, and discotic phases.

Some mesogens that find use in embodiments of the technology are E7 (mixture of 4-cyano-4'-n-pentyl-biphenyl, 4-cyano-4'-n-heptyl-biphenyl, 4-cyano-4'-n-oxyoctyl-biphenyl, 4-cyano-4"-n-pentyl-p-terphenyl), 5CB (4-n-pentyl-4'-cyanobiphenyl), MLC-2080, MLC-15700, ZLI-4792, MLC-3016, 6CB (4-cyano-4'-n-hexyl-biphenyl), or combinations thereof.

MLC-3016 and ZLI-4792 are mixtures of fluorinated LCs that contain no cyano head groups, in contrast to current technologies that rely almost exclusively on cyanobiphenyl (CB) type LCs.

The mesogenic layer can be a substantially pure compound, or it can contain other compounds, so called dopants, that enhance or alter characteristics of the mesogen. Thus, in some embodiments, the mesogenic layer further comprises a second compound, for example an alkane, which expands the temperature range over which the nematic and isotropic phases exist. Use of devices having mesogenic layers of this composition allows for detection of the analyte reactive moiety interaction over a greater temperature range.

In some embodiments, the mesogenic layer further comprises a dichroic dye or a fluorescent compound. Examples of dichroic dyes and fluorescent compounds useful in the present technology include, but are not limited to, azobenzene, BTBP, polyazo compounds, anthraquinone, perylene dyes, and the like. In some embodiments, a dichroic dye of a fluorescent compound is selected that complements the orientation dependence of the liquid crystal so that polarized light is not required for the assay. In some embodiments, if the absorbance of the liquid crystal is in the visible range, then organization changes can be observed using ambient light without crossed polarizers. In some embodiments, the dichroic dye or fluorescent compound is used in combination with a fluorimeter and changes in fluorescence are used to detect changes in organization transition of the liquid crystal.

In some embodiments, an orientation change in a LC causes a detectable change in a measureable characteristic of the composition comprising the LC. In some embodiments, the orientation change causes a change in a detectable (e.g., observable, measurable, recordable) property of the LC or of a composition comprising the LC. Examples of detectable properties that find use in embodiments of the technology include but are not limited to optical anisotropy, magnetic anisotropy, dielectric anisotropy, and/or phase transition temperature. Accordingly, some embodiments provide methods comprising measuring a change in a property selected from the group consisting of optical anisotropy, magnetic anisotropy, dielectric anisotropy, and phase transition temperature. In some embodiments, exposing the liquid crystal sensor to a sample suspected of comprising an analyte causes a phase transition in the LC from a first phase (e.g., an isotropic phase, a nematic phase, or a smectic phase) to a second phase (e.g., an isotropic phase, a nematic phase, and a smectic phase). In some embodiments, the LC undergoes an orientational transition (e.g., a homeotropic alignment to a planar alignment, a random planar alignment to a uniform planar alignment, a uniform planar alignment to a random planar alignment, a planar alignment in one direction to a planar alignment in another direction, or a planar alignment to a homeotropic alignment). In some embodiments, the LC undergoes an orientational transition from a twisted orientation to second orientation, from a chiral orientation to second orientation. In some embodiments, the LC undergoes an orientational transition from a first orientation to a twisted orientation or from a first orientation to a chiral orientation.

Analytes

The methods and devices of the present technology can be used to detect a variety of analytes. The present technology is not limited to the detection of any particular type of analyte. Exemplary analytes include, but are not limited to, sulfur compounds, nitrogen compounds, thiols, alcohols, acids, oxides, and phosphates.

The present technology finds use in the detection of variety of sulfur compounds. In some embodiments, the sulfur compounds are from a group that includes sulfides, disulfides, sulfites or sulfates, including but not limited to hydrogen sulfide, Chloromethyl trifluoromethyl sulfide, Ethylene sulfide, Dimethyl sulfide, Methyl Sulfide, Propylene sulfide, Trimethylene sulfide, 2-Chloroethyl methyl sulfide, 2-(Methylthio)ethanol, Ethyl methyl sulfide, Bis(methylthio)methane, 2-(Methylthio)ethylamine, N-Methyl-1-(methylthio)-2-nitroethenamine, Allyl methyl sulfide, 2-Chloroethyl ethyl sulfide, 3-(Methylthio)-1-propanol, 2,2'-Thiodiethanol, 2,2'-Dithiodiethanol, Diethyl sulfide, Methyl propyl disulfide, Tris(methylthio)methane, 2-(Ethylthio)ethylamine, 3-(Methylthio)propylamine, Cystamine dihydrochloride, 4-(Methylthio)-1-butanol, tert-Butyl methyl sulfide, Cyclohexene sulfide, Diallyl sulfide, Allyl disulfide, 3,3'-Thiodipropanol, 3,3'-Thiodipropanol, 3,6-Dithia-1,8-octanediol, Dipropyl sulfide, Isopropyl sulfide, Dipropyl disulfide, Isopropyl disulfide, 4-(Trifluoromethylthio)bromobenzene, 4-(Trifluoromethylthio)phenol, Phenyl trifluoromethyl sulfide, 3,5-Dichlorothioanisole, Chloromethyl 4-chlorophenyl sulfide, 4-(Trifluoromethylthio)aniline, 2-Bromothioanisole, 3-Bromothioanisole, 4-Bromothioanisole, 2-Chlorothioanisole, 3-Chlorothioanisole, 4-Chlorothioanisole, Chloromethyl phenyl sulfide, 2-Fluorothioanisole, 4-Fluorothioanisole, 4-Nitrothioanisole, Thioanisole, 2-(Methylthio)aniline, 3-(Methylthio)aniline, 4-(Methylthio)aniline, 2-(Methylthio)cyclohexanone, 3-(Methylthio)-1-hexanol, 4-(Trifluoromethylthio)benzyl bromide, 4-(Trifluoromethylthio)benzyl alcohol, Phenyl vinyl sulfide, 4-(Methylthio)benzyl bromide, 2-Chloroethyl phenyl sulfide, 4-(Methylthio)benzyl chloride, 2-Methoxythioanisole, 2-(Phenylthio)ethanol, 4-Methoxythioanisole, 4-(Methylthio)benzyl alcohol, Methoxymethyl phenyl sulfide, Ethyl phenyl sulfide, Methyl p-tolyl sulfide, Dibutyl sulfide, Dibutyl disulfide, Bis(trimethylsilylmethyl) sulfide, Phenyl propargyl sulfide, (4-Chlorophenylthio)acetone, Benzyl 2,2,2-trifluoroethyl sulfide, 4'-(Methylthio)acetophenone, Allyl phenyl sulfide, Cyclopropyl phenyl sulfide, 2-Nitro-5-(propylthio)aniline, S-Benzylcysteamine hydrochloride, Isoamyl sulfide, 4'-Methylthioisobutyrophenone, Pentafluorophenyl sulfide, Bithionol, Bis(3,5-dichlorophenyl) disulfide, Bis(3,5-dichlorophenyl) disulfide, Bis(4-chlorophenyl) disulfide, 3-Nitrophenyl disulfide, 4-Nitrophenyl disulfide, Bis(2-nitrophenyl) disulfide, 2-Nitrophenyl phenyl sulfide, 4-Nitrophenyl phenyl sulfide, 2-(4-Chlorophenylthio)aniline, 4-Amino-4'-nitrodiphenyl sulfide, 3,3'-Dihydroxydiphenyl disulfide, Diphenyl sulfide, Diphenyl disulfide, Phenyl disulfide, 2-(Phenylthio)aniline, 2,2'-Diaminophenylsulfide, 4,4'-Diaminodiphenyl sulfide, 2,2'-Dithiodianiline, Hexyl sulfide, Benzyl phenyl sulfide, Bis(phenylthio)methane, Dodecyl methyl sulfide, 2-Nitro-p-tolyl disulfide, Bis(4-methoxyphenyl) disulfide, Dibenzyl sulfide, Dibenzyl disulfide, p-Tolyl disulfide, Benzyl trisulfide, 2-[2-(Aminomethyl)phenylthio]benzyl alcohol, Phenylacetyl disulfide, Dioctyl sulfide, Chlorotriphenylmethyl disulfide, Tris(phenylthio)methane, Tris(phenylthio)methane, Dodecyl sulfide, Hexakis[(4-methylphenyl)thio]benzene, and Hexakis(benzylthio)benzene, Potassium methyl sulfate, Formaldehyde-sodium bisulfite adduct, Methyl sulfate sodium salt, Glyoxal bis(sodium hydrogen sulfite) adduct hydrate, Ethylene sulfite, Glyoxal sodium bisulfite addition compound hydrate, Dimethyl sulfite, Diethyl sulfite, Glutaraldehyde sodium bisulfite addition compound, Dipropyl sulfate, 4-Acetylphenyl sulfate potassium salt, Sodium 2-ethylhexyl sulfate, Sodium octyl sulfate, Dibutyl sulfate, 4-Hydroxy-3-methoxyphenylglycol sulfate potassium salt, Sodium dodecyl sulfate, Ammonium lauryl sulfate solution, Tetradecyl sulfate sodium salt, and Octadecyl sulfate sodium salt. In some embodiments the sulfur compounds are from a group that includes triflates such as but limited to (Trimethylsilyl)methyl trifluoromethanesulfonate, (Trimethylsilyl)methyl trifluoromethanesulfonate, 4-Nitrophenyl trifluoromethanesulfonate, Phenyl trifluoromethanesulfonate, 1-Cyclohexenyl trifluoromethanesulfonate, Catechol bis(trifluoromethanesulfonate), p-Tolyl trifluoromethanesulfonate, 4-Acetylphenyl trifluoromethanesulfonate, 2,6-Dimethoxyphenyl trifluoromethanesulfonate, 3,5-Dimethoxyphenyl trifluoromethanesulfonate, 2-(Trimethylsilyl)phenyl trifluoromethanesulfonate, Di-tert-butylsilylbis(trifluoromethanesulfonate), 1-Naphthyl trifluoromethanesulfonate, 2-Naphthyl trifluoromethanesulfonate, 4,4'-Biphenol bis(trifluoromethanesulfonate), 3,5-Di-tert-butylphenyl trifluoromethanesulfonate, 1,1'-Bi-2-naphthol bis(trifluoromethanesulfonate). In some embodiments, the sulfur is in an oxidized state, including but not limited to sulfur dioxide, sulfur trioxide, sulfuric acid, sulfur oxide, Methyl phenyl sulfoxide, Phenyl vinyl sulfoxide, Methyl p-tolyl sulfoxide, Butyl sulfoxide, Methyl 2-phenylsulfinylacetate, Diphenyl sulfoxide, p-Tolyl sulfoxide, Dodecyl methyl sulfoxide, and Dibenzyl sulfoxide. In other embodiments, the sulfur is in a compound with halogenated elements, such as sulfenyl halides, sulfinyl halides, and sulfonyl halides including but not limited to Chlorocarbonylsulfenyl chloride, Methoxycarbonylsulfenyl chloride, 2,4-Dinitrobenzenesulfenyl chloride, 4-Nitrobenzenesulfenyl chloride, Trichloromethanesulfinyl chloride, tert-Butylsulfinyl chloride, 2,4,5-Trichlorobenzenesulfonyl chloride, 3,4-Dichlorobenzylsulfonyl chloride, 2-Chlorobenzylsulfonyl chloride, Trichloromethanesulfonyl chloride, Methanesulfonyl fluoride, Chlorosulfonylacetyl chloride, N,N-Dimethylsulfamoyl chloride, Cyclopropanesulfonyl chloride, 2-Propanesulfonyl chloride, Perfluoro-1-butanesulfonyl fluoride, 2-Bromo-4,6-difluorobenzenesulfonyl chloride, 2,3,4-Trichlorobenzenesulfonyl chloride, 2,5-Dibromobenzenesulfonyl chloride, Benzene-1,3-disulfonyl chloride, Cyclohexanesulfonyl chloride, m-Toluenesulfonyl chloride, disulfur dichloride, sulfur hexafluoride, thionyl chloride, and sulfuryl chloride.

In some embodiments, the analyte contains nitrogen, including but not limited to nitrogen, ammonia, $NO_2$, 1,3,5-Trinitrobenzene (TNB), Methyl nitrate, Nitroglycerin (NG), Triaminotrinitrobenzene (TATB), and Pentaerythritol tetranitrate (PETN). In some embodiments, the nitrogen containing compound is an amine. The amine may have an alkyl or an aryl functional group, may be aliphatic or aromatic in structure, may be represented by an organic compound that is a primary, secondary or tertiary amine including but not limited to methylamine, ethanolamine, trisamine, dimethylamine, methylethanolamine, aziridine, azetidine, pyrrolidine, piperidine, trimethylamine, dimethylethanolamine, aniline, cadaverine, idole, putrescine, and bis-tris methane.

In some embodiments, the analyte is a thiol, including but not limited to methanethiol, ethanethiol, cysteine, 2-mercaptoethanol, dithiothreitol, and 2-mercaptoindole.

In some embodiments, the analyte is chlorine or chlorine dioxide. In some embodiments, the analyte is an alcohol. The alcohol may be cyclic or acyclic, may be represented by an organic compound that is a primary, secondary or tertiary alcohol including but not limited to methanol, ethanol, isopropanol, tert-butyl alcohol, propanol, cyclopropanols, cyclobutanols, cyclopentanols, cyclopropanols, cyclohexanol, cycloheptanols, benzylic alcohols, diarylmethanols, and allylic alcohols.

In some embodiments, the analyte is an acid. The acid may be organic or inorganic, monoprotic, diprotic or triprotic, including but not limited to acetic acid, sulfuric acid, hydrochloric acid, hypochlorous acid, chorous acid, chloric acid, perchloric acid, hydrobromic acid, hydroiodic acid, hydrofluoric acid, nitric acid, nitrous acid, carbonic acid, phosphoric acid, citric acid, formic acid, chromic acid, methanesulfonic acid, ethanesulfonic acid, benzenesulfonic acid, toluenesulfonic acid, folic acid, peracetic acid, and salicylic acid.

In some embodiments, the analyte is an oxide or its derivative, including but not limited to oxygen, nitric oxide, nitrous oxide, nitrogen dioxide, nitrogen dioxide, carbon monoxide, carbon dioxide, sulfur dioxide, ozone, and peroxides.

In some embodiments, the analyte is a phosphate that may be organic or inorganic, including but not limited to ammonium phosphate, boranophosphate, diammonium phosphate, phosphagen, phosphate, phosphoric acid, phosphotungstic acid, polyphosphate, pyrophosphoric acid, and urea phosphate. In some embodiments, the organophosphates are those used as pesticides, including, but not limited to, Acephate (Orthene), Azinphos-ethyl, Azinphos-methyl (Guthion), Azinphos-methyl oxon, Bromophos-methyl, Carbophenothion (Trithion), Chlorfenvinphos (Supona), Chloropyrifos (Dursban/Lorsban), Chlorpyrifos-methyl, Chlorthiophos, Coumaphos (Co-Ral), Crotoxyphos (Ciodrin), Cyanophos, DEF (Buffos), Demeton (Systox), Demeton-Dialifor (Torak), Diazinon (O Analog), Diazinon (Spectracide), Dichlorvos-DDVP (Vapona), Dicrotophos (Bidrin), Dimethoate (Cygon), Dioxathion (Delnav), Disulfoton (Disyston), Disulfoton Sulfone, Edifenphos, EPN, Ethion (Nialate), Ethoprop (Mocap), Ethyl Parathion, Fenamiphos (Nemacur), Fenitrothion (Sumithion), Fensulfothion (Dasanit), Fenthion (Baytex), Fonofos (Dyfonate), Formothion, Heptenophos, Imidan (Phosmet), Isazophos (Triumph), Isofenphos (Amaze), Leptophos (Phosvel), Malaoxon, Malathion (Celthion), Merphos (Tribufos), Methamidophos (Monitor 4), Methidathion, Methyl Parathion (Metacide), Mevinphos (Phosdrin), Monocrotophos, Naled, Omethoate (Dimethoate O analog), Parathion (Alkron), Paroxon, Phorate (Thimet), Phorate-o, Phorate Sulfone, Phorate Sulfoxide, Phosalone, Phosphamidon (Dimecron), Piperophos, Pirimiphos-ethyl, Pirimiphos-methyl, Profenofos (Curacron), Propetamphos (Safrotin), Pyrazophos (Afgan), Quinalphos, Ronnel (Ectoral) (Fenchlorphos), Sulprofos (Bolstar), Terbufos (Counter), Tetrachlorvinphos (Gardona), Thionazin (Zinophos), and Triazophos (Hostathion). In some embodiments, the organophosphates are nerve agents (e.g., agents of war), including, but not limited to G agents (GD, soman; GB, sarin; and GA, tabun) and the V agents (VX).

In some embodiments, the analyte is acrolein or other aldehydes.

Particular exemplary analytes include $H_2S$, $NO_2$, and HCHO, as discussed below in the Examples.

Substrates

Substrates that find use in practicing the present technology can be made of practically any physicochemically stable material. In a preferred embodiment, the substrate material is non reactive towards the constituents of the mesogenic layer. The substrates can be either rigid or flexible and can be either optically transparent or optically opaque. The substrates can be electrical insulators, conductors, or semiconductors. Further, the substrates can be substantially impermeable to liquids, vapors and/or gases or, alternatively, the substrates can be permeable to one or more of these classes of materials. Exemplary substrate materials include, but are not limited to, inorganic crystals, inorganic glasses, inorganic oxides, metals, organic polymers and combinations thereof. In some embodiments, the substrates have micropillared features thereon for the stabilization of the liquid crystal overlay and/or other reagents to the substrate surface or detection regions thereon.

a. Inorganic Crystal and Glasses

In some embodiments of the present technology, inorganic crystals and inorganic glasses are utilized as substrate materials (e.g., LiF, NaF, NaCl, KBr, KI, $CaF_2$, $MgF_2$, $HgF_2$, BN, $AsS_3$, ZnS, $Si_3N_4$, and the like). The crystals and glasses can be prepared by conventional techniques (see, e.g., Goodman, Crystal Growth Theory and Techniques, Plenum Press, New York 1974). Alternatively, the crystals can be purchased commercially (e.g., Fisher Scientific). The crystals can be the sole component of the substrate or they can be coated with one or more additional substrate components. Thus, it is within the scope of the present technology to utilize crystals coated with, for example, an organic polymer. Additionally, a crystal can constitute a portion of a substrate that contacts another portion of the substrate made of a different material, or a different physical form (e.g., a glass) of the same material. Other useful substrate configurations utilizing inorganic crystals and/or glasses will be apparent to those of skill in the art.

b. Inorganic Oxides

In other embodiments of the present technology, inorganic oxides are utilized as the substrate. Inorganic oxides of use in the present technology include, for example, $Cs_2O$, $Mg(OH)_2$, $TiO_2$, $ZrO_2$, $CeO_2$, $Y_2O_3$, $Cr_2O_3$, $Fe_2O_3$, $NiO$, $ZnO$, $Al_2O_3$, $SiO_2$ (glass), quartz, $In_2O_3$, $SO_2$, $PbO_2$, $Ta_2O_5$, $TaO_2$, and the like. The inorganic oxides can be utilized in a variety of physical forms such as films, supported powders, glasses, crystals, and the like. A substrate can consist of a single inorganic oxide or a composite of more than one inorganic oxide. For example, a composite of inorganic oxides can have a layered structure (e.g., a second oxide deposited on a first oxide) or two or more oxides can be arranged in a contiguous non-layered structure. In addition, one or more oxides can be admixed as particles of various sizes and deposited on a support such as a glass or metal sheet. Further, a layer of one or more inorganic oxides can be intercalated between two other substrate layers (e.g., metal oxide metal, metal oxide-crystal).

In some embodiments, the substrate is a rigid structure that is impermeable to liquids and gases. In this embodiment, the substrate consists of a glass plate onto which a metal, such as gold, is layered by evaporative deposition. In a still further embodiment, the substrate is a glass plate ($SiO_2$) onto which a first metal layer such as titanium or gold has been layered. A layer of a second metal (e.g., gold) is then layered on top of the first metal layer (e.g., titanium).

c. Organic Polymers

In still other embodiments of the present technology, organic polymers are utilized as substrate materials. Organic polymers useful as substrates in the present technology include polymers that are permeable to gases, liquids, and molecules in solution. Other useful polymers are those that are impermeable to one or more of these same classes of compounds.

Organic polymers that form useful substrates include, for example, polyalkenes (e.g., polyethylene, polyisobutene, polybutadiene), polyacrylics (e.g., polyacrylate, polymethyl methacrylate, polycyanoacrylate), polyvinyls (e.g., polyvinyl alcohol, polyvinyl acetate, polyvinyl butyral, polyvinyl chloride), polystyrenes, polycarbonates, polyesters, polyurethanes, polyamides, polyimide s, polysulfone, polysiloxanes, polyheterocycles, cellulose derivatives (e.g., methyl cellulose, cellulose acetate, nitrocellulose), polysilanes, fluorinated polymers, epoxies, polyethers, and phenolic resins (see, Cognard (1982) "Alignment of Nematic Liquid Crystals and Their Mixtures" in *Mol. Cryst. Liq. Cryst.* 1: 174). Some organic polymers include polydimethylsiloxane, polyethylene, polyacrylonitrile, cellulosic materials, polycarbonates, and polyvinyl pyridinium.

In some embodiments, the substrate is permeable and it comprises a layer of gold, or gold over titanium, which is deposited on a polymeric membrane, or other material, that is permeable to liquids, vapors, and/or gases. The liquids and gases can be pure compounds (e.g., chloroform, carbon monoxide) or they can be compounds that are dispersed in other molecules (e.g., aqueous protein solutions, herbicides in air, alcoholic solutions of small organic molecules, etc.). Useful permeable membranes include, but are not limited to, flexible cellulosic materials (e.g., regenerated cellulose dialysis membranes), rigid cellulosic materials (e.g., cellulose ester dialysis membranes), rigid polyvinylidene fluoride membranes, polydimethylsiloxane, and track etched polycarbonate membranes.

In a further embodiment, a layer of gold on the permeable membrane is itself permeable. In some embodiments, the permeable gold layer has a thickness of about 70 Angstroms or less.

In those embodiments wherein the permeability of the substrate is not a concern and a layer of a metal film is used, the film can be as thick as is necessary for a particular application. For example, if the film is used as an electrode, the film can be thicker than in an embodiment in which it is necessary for the film to be transparent or semi-transparent to light.

Thus, in some embodiments, the film has a thickness from about 0.01 nanometer to about 1 micrometer, e.g., about 5 nanometers to about 100 nanometers. In some embodiments, the film has a thickness of from about 10 nanometers to about 50 nanometers.

Detection

LC materials typically comprise rod-shaped organic molecules. These molecules form anisotropic condensed phases that possess long-range orientational ordering (crystal-like) but lack positional ordering (liquid-like). The long-range ordering of molecules within an LC gives rise to anisotropic properties. Thus, in some embodiments, disrupting the order of the LC produces an organizational transition in the LC that is detectable as a change in a physical property of the LC (e.g., a change in the phase transition temperature, optical characteristics (e.g., birefringence, photoluminescence, fluorescence, etc.), dielectric anisotropy, magnetic anisotropy, or a change in the orientation of the LC on a surface) that can be detected using a variety of instruments capable of detecting these physical changes.

LC sensor characteristics and detection methodologies are described by, e.g., U.S. Pat. No. 6,284,197, which is incorporated herein by reference; and in U.S. Pat. App. Ser. Nos. 61/779,569 and 61/779,561, each of which is incorporated herein by reference. Further LC sensor characteristics and detection methodologies are provided, e.g., in Int'l App. Pub. Nos. WO 2001/061357; WO 2001/061325; WO 1999/063329; WO/2014/165196, each of which is incorporated herein by reference.

Sensitivity Tuning

In some embodiments, the detection chemistry is tuned to provide sufficient sensitivity for the analyte and/or to provide a more rapid response to analyte. For example, some sensors comprise a density of the detection functionality that maintains the organization and/or orientation of the LC at low concentrations of analyte exposure, which is manifest as a delay in the signal indicating the presence of the analyte (e.g., a higher concentration of analyte must accumulate to produce a change in the LC alignment and thus produce a detectable signal). Thus, in some embodiments, sensitivity is increased by reducing the number of detection functionalities that can react with the analyte in a test sample, e.g., by decreasing the number or density of the detection functionalities on the sensor substrate (e.g., by use of a spacer molecule). For example, particular embodiments of the sensors comprise the minimum amount of detection functionalities required to achieve alignment of the LC. Accordingly, in these sensors a trace, minimal, and/or low concentration of analyte disrupts LC alignment and therefore provides a rapid response to low analyte concentration.

This sensitivity tuning technology is applicable to extant sensor technology (e.g., in which the same chemical functionality comprises both the detection functionality and the alignment functionality or in which the chemical functionality provides both functions (e.g., provides both the alignment of the LC and the detection of the analyte) and to the sensor technology provided herein in which the alignment of the LC and the detection of the analyte are provided by two separate functionalities.

Furthermore, in some embodiments, the sensitivity tuning is homogenous over the surface of the sensor. That is, the technique described herein for tuning the sensor sensitivity is used to modify (e.g., increase or decrease) the sensitivity of the sensor essentially the same over the surface of the sensor). That is, the density of reactive sites; the ratio of aligning and non-aligning LC components; the ratio of spacer to alignment functionality, anchoring functionality, or detection functionality; density of pre-reacted sites; bias by electric field; and/or bias by magnetic field is homogenous across the sensor.

In some embodiments, the sensitivity tuning is heterogenous over the surface of the sensor (e.g., in one dimension (e.g., along the sensor length) of the sensor surface). See, e.g., FIG. 8. For example, in some embodiments the sensor has been tuned to provide a gradient of sensitivity along a dimension of the sensor. For example, in some embodiments, the sensor is increasingly or decreasingly sensitive to the analyte as a function of distance from the sensor's component that allows exposure of the sensor to the analyte (see, e.g., FIG. 8, top (linear sensitivity) and middle (step function sensitivity)). The technology is not limited in the function relating sensitivity to distance from the site of exposure to analyte, e.g., the increase or decrease in sensitivity may change linearly, logarithmically, exponentially, geometrically, or as governed by any other mathematical function.

Accordingly, in such embodiments, measuring the distance of the "front" of the sensor's detectable change from the component that allows exposure of the sensor to the analyte is a function of the amount of analyte exposure measured by the sensor. That is, in some embodiments, the concentration or accumulated exposure to an analyte is related to the size of an area of the device in which the liquid crystal has undergone a detectable change (a "reacted area" of the device). Consequently, embodiments are provided in which quantifying an analyte concentration is related to measuring a size of a LC reacted area. For instance, in some embodiments the methods comprise quantifying an analyte concentration by measuring a distance of a birefringent front from a site of exposure of the liquid crystal sensor device to the sample suspected of comprising the analyte. In some embodiments, measuring an anisotropy provides an observable property to differentiate two regions of the sensor (e.g., the "unreacted area" and the "reacted area") and thus assess the size (e.g., the length) of the reacted area. In some embodiments, the anisotropy is an optical anisotropy and the interrogation comprises measuring a reflection or a transmission of polarized light.

Figure 8:
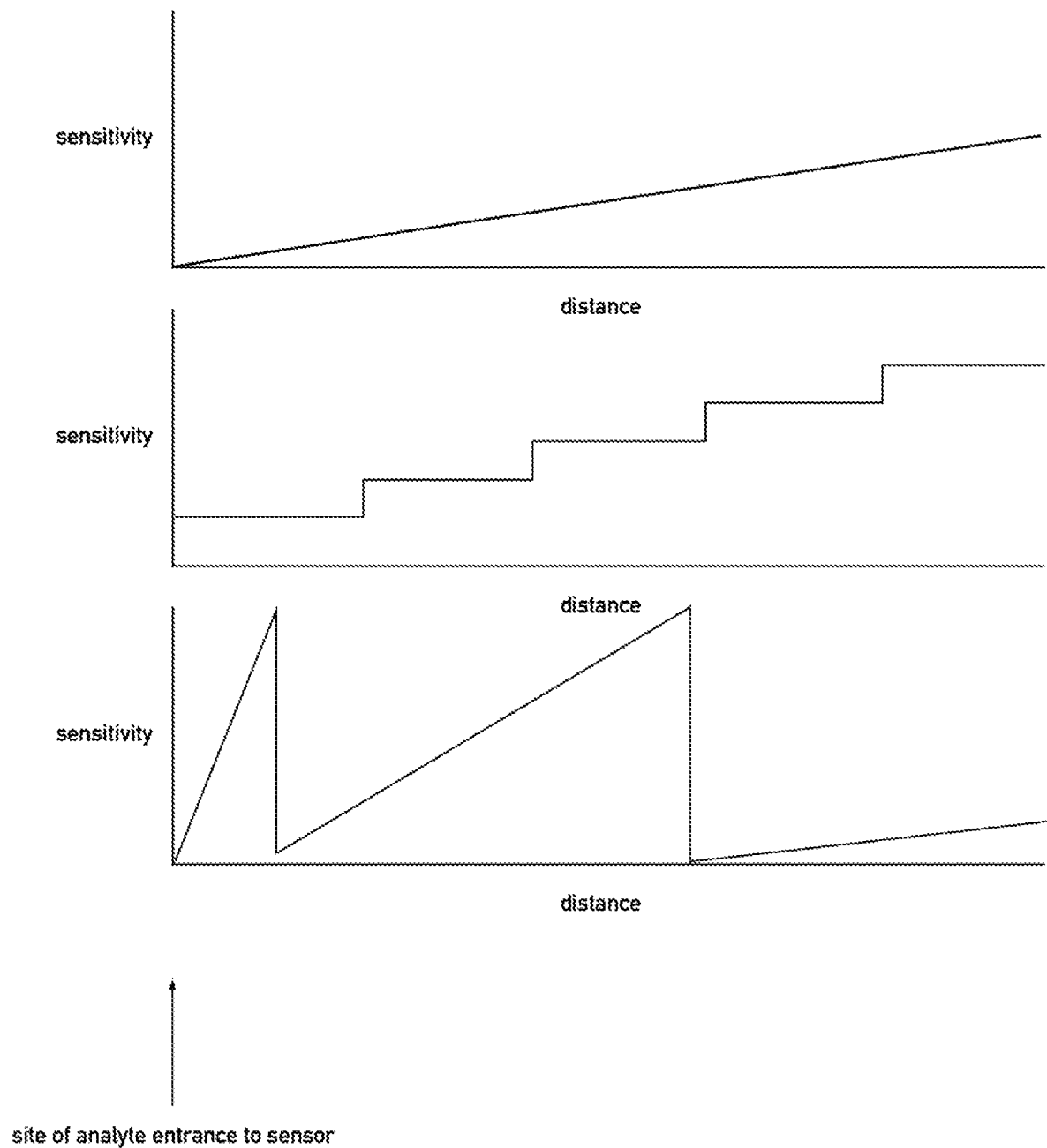
FIG. 8 shows exemplary sensors that are tuned according to functions of sensitivity versus distance from the sensor site of analyte exposure. In the top graph, the sensor has a sensitivity that is tuned to increase linearly from the site of analyte exposure; in the middle graph, the sensor has several zones of sensitivity along the length of the sensor from the site of analyte exposure; in the bottom graph, the sensor has several zones of gradient sensitivity to the analyte, e.g., to provide several regions of varying dynamic range for detection of the analyte.

In some embodiments, the sensor comprises a plurality of sensitivity zones each tuned for a particular sensitivity to an analyte (see, e.g., FIG. 8, middle). That is, in some embodiments the sensor comprises a plurality of regions wherein each region is homogenously tuned for a particular sensitivity to the analyte, but the sensitivity from zone to zone (e.g., between a first zone and a second zone) is heterogenous. Furthermore, in some embodiments the sensor comprises a plurality of sensitivity zones each comprising a heterogeneous sensitivity that has been tuned to provide a gradient of sensitivity that varies as a function of a dimension of the particular zone (see, e.g., FIG. 8, bottom). Thus, in some embodiments sensors comprise a plurality of zones each having a gradient of sensitivity to the analyte. Accordingly, some embodiments provide sensors comprising multiple regions to provide a plurality of dynamic ranges within a single sensor.

For embodiments of sensors in which the same chemical functionality provides both the alignment of the LC and the detection of the analyte, the chemical functionality is mixed with another component (e.g., a spacer) that does not align the LC and/or that does not detect the analyte. In particular, the chemical functionality and other component (e.g., a spacer) can be provided at various ratios, e.g., a ratio that produces a change in the LC alignment at trace, minimal, low, very low analyte concentrations, and/or at an analyte concentration that is lower than the analyte concentration providing a detectable signal in a sensor that is not tuned for sensitivity. See, e.g., FIG. 1. Furthermore, in some embodiments a minimum density of surface reactive sites is necessary to induce the initial state of the liquid crystal. See, e.g., FIG. 1.

In some embodiments, the sensor comprises a first chemical functionality comprising an anchoring functionality, a detection functionality, and an alignment functionality and a second chemical functionality comprising a spacer functionality, but the second chemical functionality does not comprise a detection functionality and/or does not comprise an alignment functionality. The anchoring functionality comprises a chemically reactive group for attaching the detection functionality and alignment functionality to the substrate and the spacer functionality comprises a chemically reactive group (e.g., which, in some embodiments is the same chemically reactive group as the chemically reactive group of the anchoring functionality and in some embodiments is a different chemically reactive group as the chemically reactive group of the anchoring functionality) for attaching the second chemical functionality to the substrate. Thus, the chemical functionality comprising the spacer functionality occupies positions on the substrate but does not provide or comprise a detection functionality and/or does not provide or comprise an alignment functionality. The first and second chemical functionalities (e.g., comprising the anchoring and spacer functionalities, respectively) are provided in various embodiments at ratios such that the fraction of the substrate that comprises anchoring functionalities (and thus further comprises detection and alignment functionalities) ranges from approximately 0 to 1 (e.g., 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, and 0.99). With respect to this aspect of the technology related to tuning the sensitivity of liquid crystal sensors, the technology is not limited in the fraction of the substrate that comprises anchoring functionalities (and thus further comprises detection and alignment functionalities) provided that the sensitivity tuned liquid crystal sensor produces a detectable signal at a lower amount and/or concentration of the analyte than a sensor that is not tuned for sensitivity as described herein.

For embodiments of sensors as provided herein (in which the alignment of the LC and the detection of the analyte are provided by two separate functionalities), one or more of the anchoring functionality, detecting functionality, and/or aligning functionality is mixed with another component that does not provide or comprise the anchoring functionality, detecting functionality, and/or aligning functionality (e.g., a spacer). That is, in some embodiments the sensor comprises one or more functionalities (e.g., a spacer) that occupy a position in place of one or more anchoring functionality, detection functionality, and/or alignment functionality, but that do not function as an anchoring functionality, detection functionality, and/or alignment functionality, e.g., to detect an analyte and communicate a change in state in a detection functionality to a change in orientation of the LC, e.g., the chain of interaction and/or communication from the detected analyte to the LC orientation change is incomplete, interrupted, etc. at one or more sensor positions.

For example, in some embodiments, the sensor comprises 1) a plurality of an anchoring functionality that comprises a first chemical functionality that is chemically bonded to the substrate and a second chemical functionality that interacts with a detection functionality to anchor the detection functionality to the substrate; and 2) a plurality of a spacer functionality that comprises a first chemical functionality that is chemically bonded to the substrate but that does not comprise a chemical functionality that interacts with the detection functionality. Accordingly, the substrate comprises fewer detection functionalities than if the substrate comprised only anchoring functionalities that anchored detection functionalities to the substrate. In some embodiments, the fraction of the substrate comprising an anchoring functionality (e.g., and the fraction of the substrate comprising a detection functionality) ranges from approximately 0 to 1 (e.g., 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, and 0.99).

In other exemplary embodiments, the sensor comprises 1) a plurality of an alignment functionality that comprises a first chemical functionality that interacts with the LC and a second chemical functionality that interacts with a detection functionality such that a change in state of the detection functionality is communicated to the alignment functionality (e.g., to effect a orientation change in the LC); and 2) a plurality of a second functionality (e.g., a spacer) that comprises a first chemical functionality that interacts with the alignment functionality but that does not communicate with the detection functionality. Accordingly, the sensor comprises fewer detection functionalities that effect an orientation change in the LC than if the sensor comprised only detection functionalities that effected an LC orientation change by communicating with the alignment functionality. Alternatively, in some embodiments, the sensor comprises 1) a plurality of an alignment functionality that comprises a first chemical functionality that interacts with the LC and a second chemical functionality that interacts with a detection functionality such that a change in state of the detection functionality is communicated to the alignment functionality; and 2) a plurality of a second functionality (e.g., a spacer) that comprises a first chemical functionality that interacts with and/or communicates with the detection functionality but that does not interact with (e.g., does not align or cause a change in alignment in) the LC. Accordingly, in some embodiments the sensor comprises fewer detection functionalities that effect an orientation change in the LC than if the sensor comprised only detection functionalities that effected an LC orientation change by communicating with the alignment functionality. In some embodiments, the fraction of the sensor comprising a detection functionality that effects a orientation change in the LC ranges from approximately 0 to 1 (e.g., 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, and 0.99).

In some embodiments, the sensor comprises a plurality of a detection functionality that interacts with an analyte and communicates with the alignment functionality and a plurality of another functionality that does not interact with the analyte but interacts with one or both of an anchoring functionality and/or detection functionality. In some embodiments, the fraction of the sensor comprising a detection functionality that interacts with an analyte ranges from approximately 0 to 1 (e.g., 0.01, 0.05, 0.1, 0.15, 0.2, 0.25, 0.3, 0.35, 0.4, 0.45, 0.5, 0.55, 0.6, 0.65, 0.7, 0.8, 0.85, 0.9, 0.95, and 0.99).

Further, in some embodiments, the sensitivity of a sensor (e.g., both using current technology and as described herein) is tuned (e.g., sensitivity is increased) by pre-exposing a sensor to analyte during construction of the sensor, e.g., to react a portion of the detection sites prior to use. Thus, the sensor has been "pre-reacted" with analyte and thus comprises a decreased number or amount of detection functionalities that are reactive to analyte in a test sample. Thus, in some embodiments, devices are exposed to a "partially responsive" amount of an analyte prior to its use to detect the analyte (e.g., prior to exposing the device to a test sample comprising or suspected of comprising the analyte). In these embodiments, the device will demonstrate a response to a lower amount of analyte in a test sample than a device that has not been exposed to a partially responsive amount of the analyte. As used herein, a "partially responsive" amount, concentration, mass, etc. of an analyte is an amount, concentration, mass, etc. of the analyte that reacts with the device but that does not produce a full response from the device and or complete reaction with all of the detection functionalities. Exposure to a partially responsive amount of an analyte thus "pushes" or "primes" the device to demonstrate a response to a small amount of analyte.

In some embodiments, a sensor according to the technology provided herein is biased with an electric field prior to or during exposure to an analyte, e.g., to enhance the sensitivity of the sensor to the analyte. That is, an electric field is used in some embodiments to pre-orient a liquid crystal prior to exposure to an analyte or an electric field is used during exposure to assist orienting the liquid crystal in the sensor (e.g., to decrease a kinetic barrier to a change in orientation such that a lower concentration, amount, or mass of the analyte produces a change in orientation of the liquid crystal than the concentration, amount, or mass of the analyte that aligns the liquid crystal in the absence of the electric field).

In some embodiments, a sensor according to the technology provided herein is biased with a magnetic field prior to or during exposure to an analyte, e.g., to enhance the sensitivity of the sensor to the analyte. That is, a magnetic field is used in some embodiments to pre-orient a liquid crystal prior to exposure to an analyte or a magnetic field is used during exposure to assist orienting the liquid crystal in the sensor (e.g., to decrease a kinetic barrier to a change in orientation such that a lower concentration, amount, or mass of the analyte produces a change in orientation of the liquid crystal than the concentration, amount, or mass of the analyte that aligns the liquid crystal in the absence of the magnetic field).

In some embodiments, sensitivity is increased by using a mixture of two or more (e.g., 2, 3, 4, 5 or more) liquid crystals. For instance, in some embodiments a first liquid crystal of the mixture is aligned by the alignment functionality and a second liquid crystal of the mixture is not aligned by the alignment functionality. In such embodiments, while one liquid crystal of the mixture interacts with and is aligned by the alignment functionality and the other liquid crystal of the mixture does not interact with the alignment functionality, the two liquid crystals act together as a liquid crystal, e.g., to produce a detectable change in the presence of an analyte.

Alignment Functionalities Comprising an Analyte

In some embodiments, the sensor is based on an alternative detection technology wherein the analyte provides or produces the alignment functionality. For instance, in some embodiments the analyte is polymerizable and the polymerized analyte provides the alignment functionality that aligns the liquid crystal and produces a detectable signal indicating the presence of the analyte. In some embodiments, the sensor devices comprise a chemical functionality that interacts with the analyte to react with or promote (e.g., catalyze) the polymerization of the analyte. For instance, in particular embodiments to detect formaldehyde (HCHO), the sensor comprises a chemical functionality comprising a hydroxyl group attached to a substrate. When formaldehyde enters the sensor, the hydroxyl groups react with the formaldehyde to produce long ether chains that align a liquid crystal (e.g., GCB). This technology may be combined with other aspects of the technology described herein; for instance, the amount of chemical functionality that promotes polymerization of the analyte may be varied, e.g., by functionalizing the substrate surface with a mixture of chemical functionalities that comprise reactive or catalytic groups with chemical functionalities that comprise nonreactive or noncatalytic groups. The ratio of the two chemical functionalities can be varied to provide the appropriate amount of reactive or catalytic groups for the analyte and sensitivity desired for the sensor.

The technology is not limited in the type of polymerizable analyte and reactive or catalytic group that promotes the polymerization of the polymerizable analyte. Indeed, the technology encompasses any type of polymerizable analyte and reactive or catalytic group that promotes the polymerization of the polymerizable analyte, e.g., cycloalkenes or dienes polymerized by metal alkylidenes, cycloalkynes or diynes polymerized by metal alkylidynes, formaldehyde or acrolein polymerized by alcohols, alkenes polymerized by metalocenes or copper radical transfer catalysts, and acrolein.

In some embodiments, the analyte produces a change in the orientation, geometry, length, etc. of a molecule to produce an alignment functionality. For instance, in some embodiments the analyte produces a synthetic reaction that lengthens a molecule to produce an alignment functionality or that alters the geometry of a molecule to produce an alignment functionality, e.g., to produce an alignment functionality having a geometry or a length sufficient to align the LC. In some embodiments, the analyte is a reactant in a synthetic reaction that produces an alignment functionality, e.g., the analyte reacts with a molecule of the sensor to produce an alignment functionality that aligns the LC. In some embodiments, synthesis of the alignment functionality (e.g., in situ in the sensor) results from addition of the analyte.

In some embodiments, the analyte attaches to a molecule, moiety, side chain, functional group, etc. to produce an alignment functionality. In some embodiments, production of an alignment functionality by the analyte comprises introduction of one or more molecules (e.g., one or more analytes) into the sensor. In some embodiments, the analyte catalyzes the linking of molecules present in the sensor to produce an alignment functionality. In some embodiments, the analyte is an alignment functionality, e.g., in some embodiments the analyte is captured by the sensor (e.g., by a detection functionality) and the captured analyte aligns the LC.

Methods of Construction

Embodiments of the technology relate to the production and/or construction of embodiments of the sensor devices described herein. For example, in some embodiments a sensor is produced by methods comprising providing a substrate, attaching an anchoring functionality to the substrate, attaching a detection functionality to the anchoring functionality, providing an alignment functionality in communication with the detection functionality, and providing an LC that interacts with the alignment functionality. See, e.g., FIG. 2.

In some embodiments, a sensor is produced by attaching a chemical functionality to a substrate, e.g., a chemical functionality that captures, reacts with, promotes, and/or catalyzes the polymerization of an analyte. Producing a sensor according to such embodiments comprises providing a liquid crystal that interacts with the polymerized analyte—that is, in some embodiments the polymerized analyte functions as an alignment functionality.

In some embodiments relating to methods of construction, a sensor is pre-reacted with an analyte to increase its sensitivity (e.g., to decrease the amount of analyte producing a detectable change in the sensor).

Methods of Use

In use, the device is placed in an area where the analyte is suspected of being present. The device is allowed to remain in place for a period of time (the exposure period, e.g., from one or more minutes to one or more hours to one or more days to one or more weeks or more).

In other uses, a liquid sample that is biological (e.g., comprising an organism such as a bacterium, virus, archaeon, or eukaryote) or pharmaceutical in nature and suspected of containing an analyte is introduced into the device. The sample is allowed to incubate for a period of time (e.g., for the exposure period, e.g., from 15 minutes to 4 days). In a preferred use, the device receives a liquid sample and is incubated at 37° C. for 1 hour with shaking to permit replication of bacteria that leads to release of metabolic gases.

Following the exposure period, the sensor is read for a change in the LC orientation. Although many changes in the LC layer can be detected by visual observation under ambient light, any means for detecting the change in the LC layer can be incorporated into, or used in conjunction with, the sensor. Thus, it is within the scope of the present technology to use lights, microscopes, spectrometry, electrical techniques, and the like to aid in the detection of a change in the LC layer. In some embodiments, the presence of analyte is detected by a change in the color and texture of the LC.

Accordingly, in those embodiments utilizing light in the visible region of the spectrum, the light can be used to simply illuminate details of the LC. Alternatively, the light can be passed through the LC and the amount of light transmitted, absorbed, or reflected can be measured. The device can utilize a backlighting device such as that described in U.S. Pat. No. 5,739,879, incorporated herein by reference. Light in the ultraviolet and infrared regions is also of use in the present technology. In other embodiments, the device, and in particular a detection region, is illuminated with a monochromatic light source (e.g., 660-nm LEDs). In some embodiments, the sensor is placed between crosspolarized lenses and light is passed though the lenses and the sensor. In still other embodiments, a detection region is masked off from the rest of the device by a template or mask that is placed over the device.

EXAMPLES

Example 1

During the development of embodiments of the technology provided herein, experiments were conducted to tune LC sensor sensitivity by modulating the density of detection sites on the surface of the sensors. Embodiments of LC sensors were constructed in which the chemical functionality was diluted with a component that does not align LC and does not react with analyte.

In particular, an embodiment of the LC sensor was constructed using aminothiophenol (ATP), which aligns the LC GCB (4'-hexyl-4-biphenylcarbonitrile) homeotropically and reacts with $NO_2$, mixed at various ratios with 11-mercaptoundecanoic acid (MUA), an alkanethiol with a carboxyl terminus that does not react with $NO_2$ and does not align GCB. Thus, both ATP and MUA comprise a thiol that is used to attach the molecules to a gold substrate, but only ATP comprises a detection functionality and an alignment functionality. Sensors made from solutions comprising 30% to 100% ATP were tested to detect the presence of 1 ppm $NO_2$. The sensor comprising 30% ATP did not align the LC homeotropic. See, e.g., FIG. 1, "30% reactive". Sensors comprising 40%, 50%, and 100% ATP aligned the LC and showed a response to $NO_2$. See, e.g., FIG. 1, "40% reactive", "50% reactive", and "100% reactive", respectively. The data indicated that the sensors had a slower response to analyte as the percentage of ATP increased. See, e.g., FIG. 1. As used herein, the term "% reactive" refers to the percentage of the reactive species used to prepare the sensor.

The technology is not limited in the attachment (e.g., anchoring) chemistry used. For example, whereas the tested embodiments comprised a sensor fabricated by attaching thiols to gold, the technology encompassed other surface and attachment (e.g., anchoring) strategies, e.g., attaching silanes to glass or phosphonic acid to titanium oxide.

Example 2—Sensing $H_2S$

During the development of embodiments of the technology described herein, experiments were conducted to test a LC sensor in which the alignment functionality and the detection functionality were provided by two separate molecules. In particular, an LC sensor was constructed in which a ligand was bound to a metal center to align the liquid crystal. When the analyte is introduced, the ligand is cleaved from the metal center and liquid crystal alignment is lost. Thus, in this particular embodiment the detection functionality is a metal and the alignment functionality is a ligand. However, the technology is not limited by the embodiment tested—embodiments of the technology comprise sensors in which the detection functionality is not necessarily a metal chemistry and the alignment functionality is not necessarily a ligand.

The sensor is made of three layers. The first layer is used to anchor the metal to the substrate (e.g., an anchor functionality), See, e.g., FIG. 2, "anchor". The second layer is the metal complex that is used to sense the analyte (e.g., a detection functionality). See, e.g., FIG. 2, "detection". The last layer is the alignment ligand (e.g., an alignment functionality). See, e.g., FIG. 2, "alignment".

Figure 2:
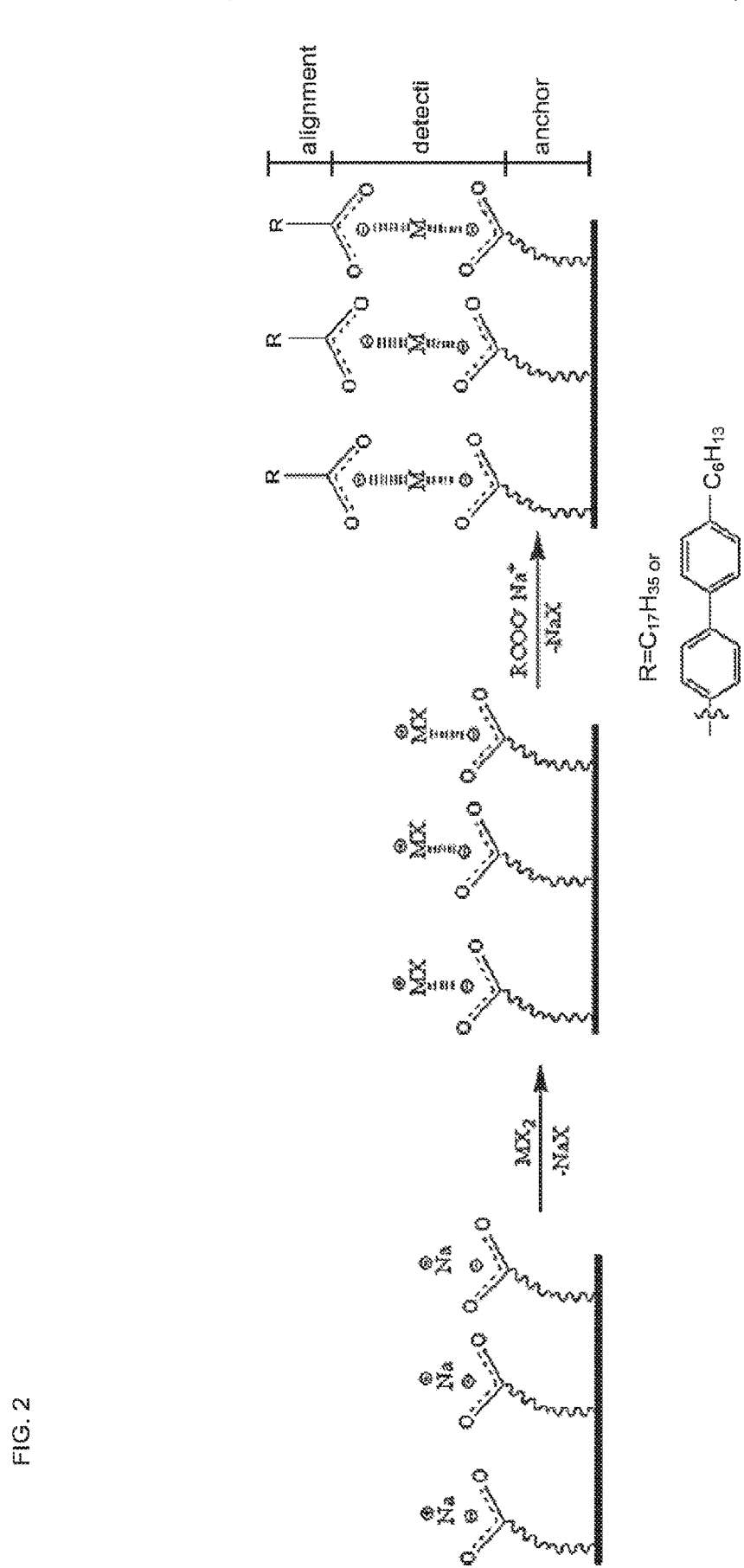
FIG. 2 is a schematic drawing showing an embodiment of a sensor as provided herein and further showing general steps for the production of an embodiment of a sensor as provided herein.

In some embodiments, the sensor is made first by attaching the anchor to a substrate. The anchor is accompanied by a counter ion. See, e.g., FIG. 2, "Na+". Then, reaction with a compound comprising the metal detection functionality (e.g., a salt comprising the metal; see, e.g., FIG. 2, "$MX_2$") displaces the counter ion and provides the metal detection functionality in the sensor. See, e.g., FIG. 2, "MX+". Finally, the alignment ligand is provided to the sensor to complete the structure. See, e.g., FIG. 2, "R" group. The technology is not limited in the alignment ligand. FIG. 2 indicates an exemplary alignment ligand for the R group.

In a particular embodiment tested herein, sensors were made on gold coated, micro-pillared glass slides. The anchoring functionality was 4-thiobenzoic acid. The thiol moiety was attached to the gold surface to form a monolayer and the carboxylate moiety of the anchoring functionality coordinated with the metal detection functionality used for analyte detection. In some embodiments, the monolayer comprises multiple components (e.g., a mixture of 4-thiobenzoic acid and thiophenol) to modify the properties of the sensor (e.g., sensitivity to the analyte). In the particular embodiment tested, the metal detection functionality was provided by $Pb^{2+}$, which interacts with $H_2S$ to provide for $H_2S$ detection. However, the technology is not limited by the detection functionality or by the choice of metals used for the detection functionality. Accordingly, any suitable metal can be used in this methodology as appropriate for the analyte to be detected. Next, the alignment functionality was applied. Two particular embodiments were tested: one that comprised an alignment functionality comprising stearate (octadecanoate) and one that comprised an alignment functionality comprising 4-hexyl-biphenyl-4'-carboxylate. Data collected during testing embodiments of the technology indicated that the 4-hexyl-biphenyl-4'-carboxylate provided a better sensor. Finally, the LC layer was applied. During the development of embodiments of the sensor described herein, 6 different types of LCs were evaluated in the LC sensors. In particular, six different LC sensors were constructed as described above, with each sensor comprising a different LC that was E7, 5CB, MLC-2080, MLC-15700, ZLI-4792, MLC-3016, or 6CB. Two of these are mixtures of fluorinated LCs (MLC-3016 and ZLI-4792), which contain no cyano head groups. Data collected during experiments to evaluated these LC sensors indicated that all of these LCs aligned homeotropically in the sensors.

Methods and Results

During the development of the technology developed herein, a multi-layered LC sensor was constructed to detect $H_2S$ according to the following steps. First, gold coated micro-pillared aluminosilicate glass slides were soaked in an ethanoic solution of 4-thiobenzoic acid (TBA) and thiophenol (PhSH) (ratio 1:9) overnight. The total concentration of thiol (concentration of TBA+concentration of PhSH) was 1 mmol. After an overnight incubation, the slides were rinsed with ethanol and then rinsed in 0.1 M NaOH. The slides were further rinsed with deionized water and rinsed again with ethanol. Next, the glass slides were placed in a solution of 0.5 M $Pb(NO_3)_2$ for 1 hour, rinsed with deionized water, and then rinsed again with ethanol. The slides were then placed in a solution of 1 mmol 4-hexyl-biphenyl-4'-carboxylate and 1.1 mmol triethylamine in ethanol for 30 minutes and then rinsed with ethanol. Finally, 0.1 µl of a 1:1 solution of MLC-3016 and octane was layered on the sensor to complete the LC sensor. See, e.g., FIG. 3.

Figure 5:
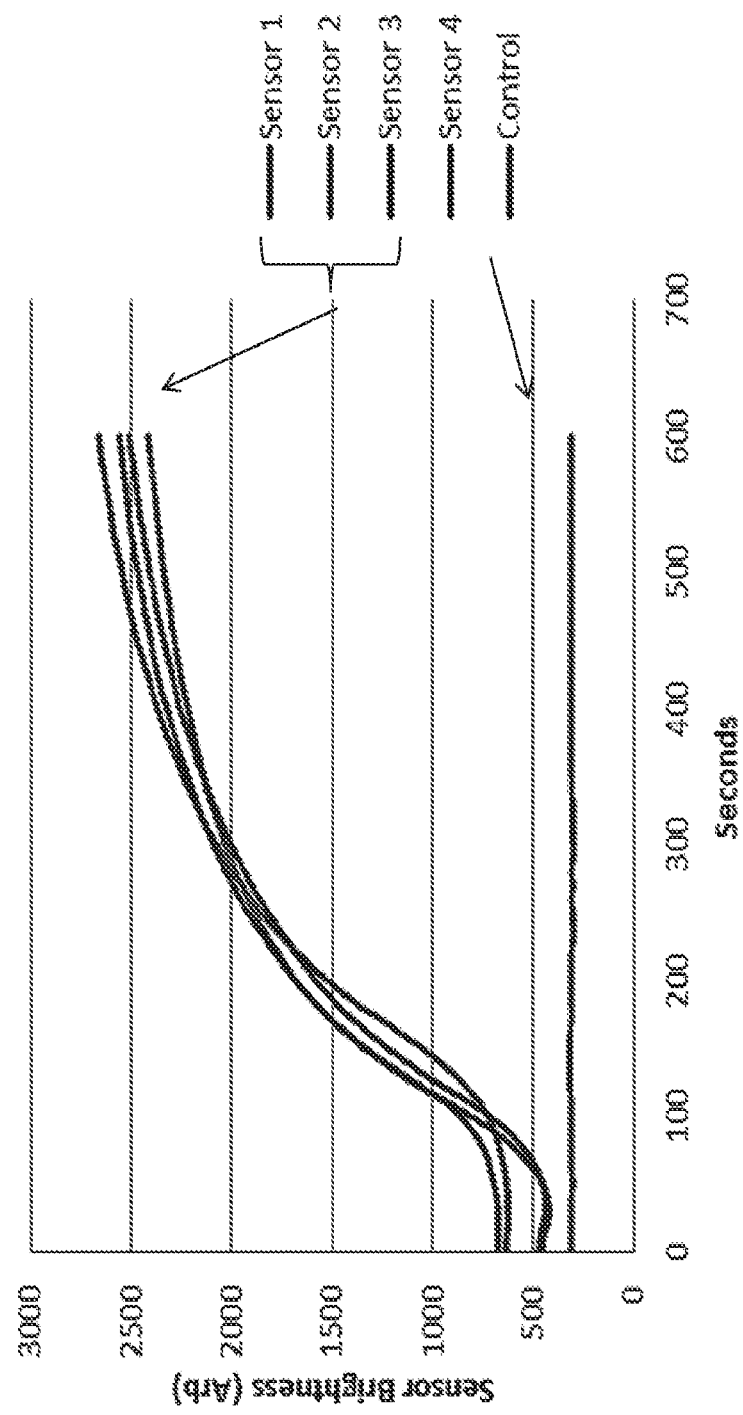
FIG. 5 is a plot showing the response of an embodiment of the sensor depicted in FIG. 3 to 1 ppm $H_2S$ in 60% relative humidity air relative to a control which was exposed to 60% relative humidity air without $H_2S$. Sensor brightness (in arbitrary units) is shown as a function of time (in seconds).

The sensors were tested by exposing the sensors to 1 ppm $H_2S$ in 60% relative humidity air at room temperature. See, e.g., FIG. 4. The sensor brightness was measured as a function of time after exposure to the $H_2S$. See, e.g., FIG. 5. Data collected during the testing of the embodiment of the technology described indicated that the LC sensor produced a detectable signal corresponding to the detection of $H_2S$ by the sensor.

Example 3—Sensing HCHO

One air pollutant that is challenging to measure affordably at low levels with specificity and accuracy is formaldehyde (HCHO). Formaldehyde is a carcinogen and is emitted from some building materials such as wood flooring and paint, and can pollute homes and buildings where the materials are installed and in factories where they are made. HCHO is of concern for indoor air quality; for example, HCHO may contribute to an ailment known as "sick building syndrome".

Due to health concerns, the National Institute of Occupational Safety and Health recommends an exposure limit for HCHO of just 16 ppb (parts per billion), a level that is frequently exceeded in new homes, many workplaces, and in the air near some gas wells that use hydraulic fracturing. Providing simple, affordable means of monitoring exposure to HCHO would provide citizens with better, actionable information; epidemiologists with better data with which to assess health risks more accurately; and regulators with the information needed to develop effective, defensible policies.

Test kits using extant technologies for measuring HCHO are available for $90-$150. In use, a sampler is hung in a room for a day, then sent to a lab for analysis. Some exemplary test kits available currently to test HCHO emissions from wood flooring take 7-10 days for results to be reported, and any positive result must be followed up more carefully with alternative methods. The least expensive HCHO monitors available are colorimetric tubes and paper badges, often retailing for <$10 each, an attractive price for personal exposure monitoring. However, these devices are not reliably quantitative, and they suffer from interference from non-target gases. Beyond these issues, colorimetric tubes are rarely validated for more than 24 to 48 hours of use. Moreover, interpreting the response can be difficult because different individuals may have different perceptions of color. The best use of these inexpensive monitors is thus for rapid on-site assessment of whether a hazard is present, but their limitations in operation, quantification, accuracy, longevity, and selectivity preclude their use for accurate personal exposure measurement. In summary, current HCHO monitoring devices are either too expensive, too complex for widespread use, or have poor measurement quality.

During the development of embodiments of the technology provided herein, a technology was designed to provide a simple, low cost HCHO dosimeter using a variant of the alignment functionality discussed herein. In some embodiments, the HCHO LC sensor provides an inexpensive, simple sensor that is accessible to a much broader section of the population than is now feasible, directly addressing the wishes of communities to monitor their local air for HCHO. Such measurements provide critical feedback on the effectiveness of corrective actions. The generation of reliable data across individuals and geographies would also be extraordinarily valuable to epidemiologists in understanding distribution of HCHO and effects of chronic exposure, and to regulators in setting rational, defensible, effective policies for HCHO exposure.

In particular, technologies related to a currently available $H_2S$ dosimeter demonstrate the basic utility and functionality of the LC dosimeter concept (see, e.g., Robinson et al. (2014) "A Liquid Crystal-Based Passive Badge for Personal Monitoring of Exposure to Hydrogen Sulfide" *J Occupational Environmental Hygiene* 11: 741-750). One feature of these devices is the 25-μm headspace that limits diffusion of target gas over the LC film, facilitating quantitative exposure measurements over long periods of time. See, e.g., Int'l Pat. App. No. PCT/US2014/024735, incorporated herein by reference in its entirety. The badge weighs just 10 g, requires no calibration, and provides exposure data immediately on site after an 8-12 hour work shift, establishing a format for toxic gas monitoring that solves maintenance, complexity, and convenience issues.

During the development of embodiments of the technology provided herein, experiments were conducted to test an alternative mechanism for sensing HCHO. The HCHO sensing mechanism improves the previous technologies by exploiting the natural tendency of HCHO to polymerize (see, e.g., Walker (1944) *Formaldehyde*. Reinhold Publishing Corp., NY, USA) (see, e.g., FIG. 6, right panel). The sensor substrate surface comprises a chemical functionality that initiates HCHO polymerization to form long polymeric chains. The resulting increased length of the polymeric structures then drives the LC to realign from a planar to a homeotropic orientation, creating a detectable optical response (see, e.g., FIG. 6, right panel). Silanes with alcohol groups can be used to initiate HCHO polymerization at the surface, harnessing another characteristic property of HCHO, its reactivity with alcohol groups (Walker, supra). The change in the LC orientation is detectable without complex instrumentation. In the context of this general sensing mechanism, the LC alignment functionality is in this example fabricated in situ by the reaction of the target with the sensor surface.

Figure 6:
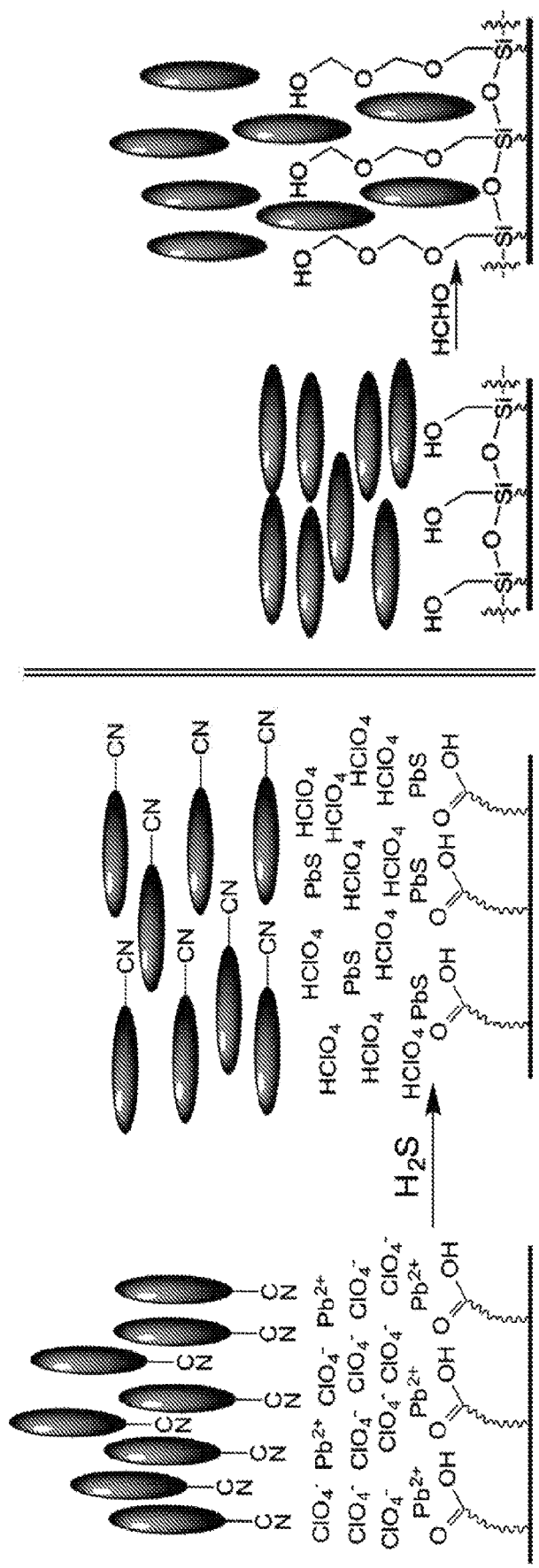
FIG. 6 is a schematic drawing comparing one current LC analyte sensing technology (left) with an embodiment of the technology described herein (right), e.g., for sensing HCHO. In a current $H_2S$ dosimeter (left), lead perchlorate anchors the LCs (ovals) in homeotropic orientation via coordination with the cyano groups and reacts with $H_2S$ whereupon LC alignment becomes planar. In an embodiment of the technology described herein, (right), LCs are in planar alignment until the addition of HCHO provides an oligomer of sufficient length to orient the LCs homeotropically. In this embodiment, the surface hydroxyl groups upon which HCHO monomers polymerize comprise silanes bonded to glass. However, the technology is not limited to silanes bonded to glass and encompasses other chemistries such as a surface comprising hydroxylated alkane thiols on a gold surface (see, e.g., Example 3) or a surface comprising phosphonic acid moieties attached to a metal oxide surface

This alternative sensing mechanism is different from that used in other LC sensors, which use coordination of the LC head functional group (e.g., cyano) with surface chemistry for alignment (see, e.g., FIG. 6, left panel). The principle of homeotropic alignment of LCs by steric interactions of aliphatic structures is well established (see, e.g., Noonan et al (2011) "Mixed Alkylsilane Functionalized Surfaces for Simultaneous Wetting and Homeotropic Anchoring of Liquid Crystals" *Appl. Mater. Interfaces* 3: 4374-4380; Crawford et al (1993) "Alignment and ordering mechanisms at a liquid crystal-solid interface" *Liq. Cryst.* 14: 1573-1585; Dierking (2003) *Textures of Liquid Crystals*, WILEY-VCH Verlag GmbH & Co. KgaA, Weinheim). Since coordination is not required for the technology tested in this example, the choices of LCs that may be used is greatly expanded. The bonds of HCHO polymers can be hydrolyzed (Thavarajah et al (2012) "Chemical and physical basics of routine formaldehyde fixation" *J Oral Maxillofacial Pathol* 6: 400-405), raising concerns that sensor responses may reverse, but it is thought that any hydrolyzed moieties reattach quickly. The tendency to form and maintain bonds exceeds the tendency for hydrolysis, resulting in an equilibrium where short polymers bound to alcohol groups are the dominant state (Walker, supra; Kiernan (2000) "Formaldehyde, formalin, paraformaldehyde and glutaraldehyde; What they are and what they do" *Microscopy Today* 1: 8-12. Note that HCHO polymerizes in water; heat or base are used to depolymerize it. The polymerization of HCHO is exothermic, as is bond formation with alcohol.

Water in the LC film can affect the equilibrium of the system, notably the extent of polymerization, surface binding, and oligomer length. LCs have varying affinity for water, making the assessment of a range LCs a key part of sensor development. In some embodiments, the LC film stabilizes the water content. Thus, in some embodiments, a hydrophobic LC blocks changes in humidity while still holding a trace water content.

This mechanism for sensing HCHO is designed to generate specificity without the need for complex instrumentation. Many existing HCHO detection methods use amines or hydrazines, which have high reactivity with the prevalent gases nitrogen dioxide and ozone. This limits the stability of the sensors and, worse, can subtract from the amount of HCHO measured. Electrochemical devices have strong interference from a variety of volatile organic compounds including alcohols. Many HCHO detection methods also measure other aldehydes and ketones—for example, the Gastec Formaldehyde Detector Tube (No. 91L) lists aldehydes, ketones, and acid gases as positive interferents. The Morphix Technologies ChromAir Formaldehyde Monitor (Part #380007), a typical HCHO badge, is inexpensive but it is difficult to interpret the color change, has low resolution, and lists aldehydes as interferents. Responding to other aldehydes and ketones greatly reduces the significance of the sensor readings, as these compounds do not have such severe health impacts as HCHO. For reference, the OSHA PEL for acetaldehyde and methyl ethyl ketone are each 200 ppm. Embodiments of the HCHO LC sensor design overcomes these limitations. For instance, alcohol groups are not oxidized as readily as amine and hydrazine, and do not react with ketones. The sensor does not respond to acetaldehyde or other common aldehydes, as they do not polymerize at room temperature. A possible exception is acrolein (OSHA PEL=100 ppb), which has a chemical structure, reactivity and health impact similar to HCHO.

Figure 7:
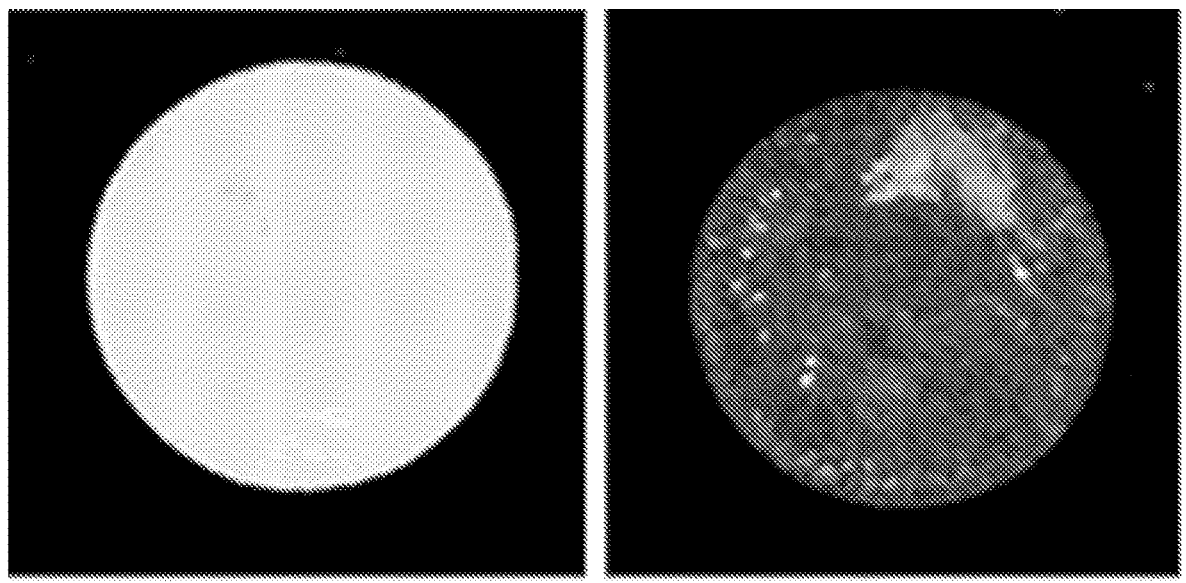
FIG. 7 is a photograph showing LC alignment by HCHO. In the left panel, a control sensor LC remains planar, appearing bright. In the right panel, a sensor surface with HCHO aligns LC homeotropically, appearing dark.

In a particular embodiment of the technology described herein, gold-coated sensor substrates (e.g., comprising glass patterned with polymeric micropillars 5 µm in height, 10 µm in diameter, and spaced 20 µm (center-to-center) to stabilize thin LC films) were incubated in a solution with equal portions of 11-mercapto-1-undecanol and 1-decanethiol to functionalize the surface with alcohol groups spaced with nonreactive methyl groups. Sensor substrates were placed in a 1% HCHO solution before spotting with the LC GCB, which aligned homeotropically and appeared dark (see, e.g., FIG. 7, right panel). A control sensor placed in water remained planar and appeared bright (see, e.g., FIG. 7, left panel). Thus, data collected during testing embodiments of the devices indicated that surface-immobilized HCHO structures orient LCs homeotropically. The alignment did not reverse to planar over 7 subsequent days in ambient air, commensurate with the stability needed for use in chemical dosimetry.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:
1. A method for detecting an analyte, the method comprising:
   1) providing a liquid crystal sensor comprising:
      a) a liquid crystal;
      b) an alignment functionality that interacts with the liquid crystal; and
      c) a detection functionality comprising a metal ion, wherein the alignment functionality is cleavably attached to the detection functionality;
   2) exposing the liquid crystal sensor to a sample suspected of comprising an analyte, wherein in the presence of the analyte the alignment functionality is cleaved from the detection functionality; and
   3) measuring a detectable property of the liquid crystal, wherein a change in the detectable property of the liquid crystal is indicative of the presence of the analyte.

2. A method of constructing a liquid crystal sensor, the method comprising:
   a) attaching an anchor functionality to a substrate;
   b) providing a detection functionality that interacts with the anchoring functionality, the detection functionality comprising a metal ion;
   c) cleavably attaching an alignment functionality to the detection functionality; and
   d) providing a liquid crystal with which the alignment functionality interacts.

3. The method of claim 2 wherein the anchoring functionality is selected from the group consisting of a carboxylate, a thiol, a silane, a sulfonic acid, a phosphonic acid, a phosphoric acid, and a carboxylic acid.

4. The method of claim 2 wherein the alignment functionality comprises an aliphatic tail, or an aliphatic tail and one or more aromatic rings, or one or more aromatic rings.

5. The method of claim 2 wherein the liquid crystal comprises a fluorinated liquid crystal.

6. The method of claim 2 wherein the detection functionality is an ammonium salt generated by applying 4-aminobiphenyl and/or 4-(4-trans-heptyl-cyclohexyl)aniline to the anchoring functionality.

7. The method of claim 1 wherein the change in the detectable property of the liquid crystal is determined by comparing the measured detectable property to a known value of the detectable property in the absence of the analyte or by comparing the measured detectable property to a previously measured value of the detectable property.

8. The method of claim 1 wherein the detectable property of the liquid crystal is selected from the group consisting of optical anisotropy, color, magnetic anisotropy, dielectric anisotropy, and phase transition temperature.

9. The method of claim 1 comprising measuring a reflection or a transmission of polarized light.

10. The method of claim 1 comprising continuously measuring the detectable property of the liquid crystal in real time.

* * * * *